(12) United States Patent
Meharwade et al.

(10) Patent No.: US 11,068,817 B2
(45) Date of Patent: Jul. 20, 2021

(54) ARTIFICIAL INTELLIGENCE AND MACHINE LEARNING BASED PROJECT MANAGEMENT ASSISTANCE

(71) Applicant: ACCENTURE GLOBAL SOLUTIONS LIMITED, Dublin (IE)

(72) Inventors: Raghavendra Meharwade, Padmanabhanagar (IN); Jeffson Dsouza, Bangalore (IN); Anubhav Gupta, Pune (IN); Niju Prabha, Bangalore (IN); Aruna Sivakumar, Bangalore (IN); Geeta Sarlashkar, Pune (IN); Lavanya Keechaneri, Bangalore (IN); Bontha Pratap, Hyderabad (IN); Avinash Mutyala, Pune (IN); Shankaranand Mallapur, Mumbai (IN); Nisha M, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 611 days.

(21) Appl. No.: 15/836,593

(22) Filed: Dec. 8, 2017

(65) Prior Publication Data

US 2019/0122153 A1    Apr. 25, 2019

(30) Foreign Application Priority Data

Oct. 25, 2017 (IN) .............................. 201711037718

(51) Int. Cl.
*G06Q 10/06* (2012.01)
*G06N 20/00* (2019.01)

(52) U.S. Cl.
CPC ....... *G06Q 10/06313* (2013.01); *G06N 20/00* (2019.01)

(58) Field of Classification Search
CPC .................... G06Q 10/06313; G06N 20/00
(Continued)

(56) References Cited

U.S. PATENT DOCUMENTS 8,484,065 B1 * 7/2013 Arredondo ............. G06Q 10/00
705/301
8,739,047 B1 * 5/2014 Holler ................. G06F 3/04842
715/759

(Continued)

OTHER PUBLICATIONS

Sprint (Software Development) posted by Margaret Rouse (available at https://searchsoftwarequality.techtarget.com/definition/Scrum-sprint) (Year: 2020).*

(Continued)

*Primary Examiner* — Folashade Anderson
(74) *Attorney, Agent, or Firm* — Mannava & Kang, P.C.

(57) ABSTRACT

In some examples, artificial intelligence and machine learning based project management assistance may include ascertaining an inquiry by a user. The inquiry may be related to a project. An attribute associated with the user and an attribute associated with the project may be ascertained. The inquiry may be analyzed based on the ascertained attributes associated with the user and the project. A predictor category may be identified, based on the analyzed inquiry, from a plurality of predictor categories that include a performance predictor category, a quality predictor category, a retrospect predictor category, and a planning predictor category. A predictor from a plurality of predictors may be identified based on the identified predictor category. A response to the inquiry may be generated based on execution of the identified predictor. Further, a display responsive to the inquiry may be generated based on the generated response.

17 Claims, 29 Drawing Sheets

(58) Field of Classification Search
USPC .......................................................... 705/7.23
See application file for complete search history.

(56) References Cited

U.S. PATENT DOCUMENTS

| | | | | |
|---|---|---|---|---|
| 8,875,088 | B1* | 10/2014 | Holler | G06Q 10/10 |
| | | | | 717/101 |
| 10,083,412 | B2* | 9/2018 | Suntinger | G06Q 10/04 |
| 10,540,573 | B1* | 1/2020 | Li | G06F 11/3688 |
| 10,572,848 | B2* | 2/2020 | Sen | G06F 3/0484 |
| 10,929,268 | B2* | 2/2021 | Bhat | G06K 9/6269 |
| 10,936,614 | B2* | 3/2021 | Kumar | G06F 11/3447 |
| 2005/0289503 | A1 | 12/2005 | Clifford | |
| 2007/0168918 | A1* | 7/2007 | Metherall | G06Q 10/06 |
| | | | | 717/101 |
| 2015/0242782 | A1* | 8/2015 | Onions | G06Q 10/06313 |
| | | | | 705/7.23 |
| 2016/0232003 | A1* | 8/2016 | Kompella | G06F 8/77 |
| 2017/0185931 | A1* | 6/2017 | Bhojan | G06F 8/20 |
| 2018/0349135 | A1* | 12/2018 | Burns | G06F 8/70 |
| 2018/0365628 | A1* | 12/2018 | Bhaskaran | G06Q 10/06314 |
| 2019/0050771 | A1* | 2/2019 | Meharwade | G06N 20/00 |
| 2019/0087179 | A1* | 3/2019 | Velayudham | G06F 11/36 |
| 2019/0243644 | A1* | 8/2019 | Jose | G06Q 10/06313 |

OTHER PUBLICATIONS

Lane, S. (Jan. 29, 2013) "Story Points Explained" retrieved from https://www.soliantconsulting.com/blog/story-points-explained/#:~:text=Velocity%20of%20Story%20Points%20You%20can%20use%20the,you%E2%80%99ve%20decided%20your%20project%20comprises%20400%20story%20points. (Year: 2013).*

LeBow, J. (2020) "Measuring the Velocity of Your Agile Scrum Team" retrieved from https://digital.ai/resources/agile-101/agile-scrum-velocity (Year: 2020).*

Geb, M. (Jul. 16, 2018) "How Story points and Velocity help plan iterations in Agile" retrieved from https://softwareplant.com/iteration-planning-story-points-2/ (Year: 2018).*

* cited by examiner

| Date | Required Story Points | Forecast | Lower Limit | Upper Limit |
|---|---|---|---|---|
| WEEK 1 (25 Sep 2017 to 01 Oct 2017) | 5760 | 5464 | 5457 | 5563 |
| WEEK 2 (02 Oct 2017 to 08 Oct 2017) | 5820 | 5529 | 5457 | 5626 |
| WEEK 3 (09 Oct 2017 to 15 Oct 2017) | 5880 | 5550 | 5497 | 5649 |
| WEEK 4 (16 Oct 2017 to 22 Oct 2017) | 5940 | 5595 | 5498 | 5694 |
| WEEK 5 (23 Oct 2017 to 29 Oct 2017) | 6000 | 5657 | 5558 | 5756 |
| WEEK 6 (30 Oct 2017 to 05 Nov 2017) | 6060 | 5688 | 5590 | 5787 |
| WEEK 7 (06 Nov 2017 to 12 Nov 2017) | 6120 | 5724 | 5625 | 5823 |
| WEEK 8 (13 Nov 2017 to 19 Nov 2017) | 6180 | 5779 | 5681 | 5878 |
| WEEK 9 (20 Nov 2017 to 26 Nov 2017) | 6240 | 5810 | 5711 | 5909 |
| WEEK 10 (27 Nov 2017 to 03 Dec 2017) | 6300 | 5857 | 5758 | 5956 |
| WEEK 11 (04 Dec 2017 to 10 Dec 2017) | 6360 | 5919 | 5820 | 6018 |
| WEEK 12 (11 Dec 2017 to 17 Dec 2017) | 6420 | 5956 | 5857 | 6054 |

*FIG. 11B*

| Date | Forecast | Lower Limit | Upper Limit |
|---|---|---|---|
| WEEK 1 (25 Sep 2017 to 01 Oct 2017) | 5 | 0 | 38 |
| WEEK 2 (02 Oct 2017 to 08 Oct 2017) | 9 | 0 | 35 |
| WEEK 3 (09 Oct 2017 to 15 Oct 2017) | 4 | 0 | 33 |
| WEEK 4 (16 Oct 2017 to 22 Oct 2017) | 8 | 0 | 38 |
| WEEK 5 (23 Oct 2017 to 29 Oct 2017) | 11 | 0 | 40 |
| WEEK 6 (30 Oct 2017 to 05 Nov 2017) | 6 | 0 | 38 |
| WEEK 7 (06 Nov 2017 to 12 Nov 2017) | 7 | 0 | 39 |
| WEEK 8 (13 Nov 2017 to 19 Nov 2017) | 10 | 0 | 41 |
| WEEK 9 (20 Nov 2017 to 26 Nov 2017) | 6 | 0 | 38 |
| WEEK 10 (27 Nov 2017 to 03 Dec 2017) | 9 | 0 | 41 |
| WEEK 11 (04 Dec 2017 to 10 Dec 2017) | 11 | 0 | 44 |
| WEEK 12 (11 Dec 2017 to 17 Dec 2017) | 7 | 0 | 39 |

ARTIFICIAL INTELLIGENCE AND MACHINE LEARNING BASED PROJECT MANAGEMENT ASSISTANCE

PRIORITY

The present application claims priority under 35 U.S.C. 119(a)-(d) to Indian patent application number 201711037718, having a filing date of Oct. 25, 2017, the disclosure of which is hereby incorporated by reference in its entirety.

A variety of techniques may be used for project management. With respect to project management generally, a team may brainstorm to generate a project plan, identify personnel and equipment that are needed to implement the project plan, set a project timeline, and conduct ongoing meetings to determine a status of implementation of the project plan. The ongoing meetings may result in modifications to the project plan and/or modifications to the personnel, equipment, timeline, etc., related to the project plan.

BRIEF DESCRIPTION OF DRAWINGS

Features of the present disclosure are illustrated by way of example and not limited in the following figure(s), in which like numerals indicate like elements, in which:

FIGS. 11A and 11B illustrate a cumulative velocity output with respect to the velocity predictor of the artificial intelligence and machine learning based project management assistance apparatus of FIG. 1 in accordance with an example of the present disclosure;

FIGS. 17A and 17B illustrate throughput with respect to the throughput predictor of the artificial intelligence and machine learning based project management assistance apparatus of FIG. 1 in accordance with an example of the present disclosure;

FIGS. 19A and 19B illustrate defects status by priority and defect details with respect to the defect injection predictor of the artificial intelligence and machine learning based project management assistance apparatus of FIG. 1 in accordance with an example of the present disclosure;

DETAILED DESCRIPTION

Figure 1:
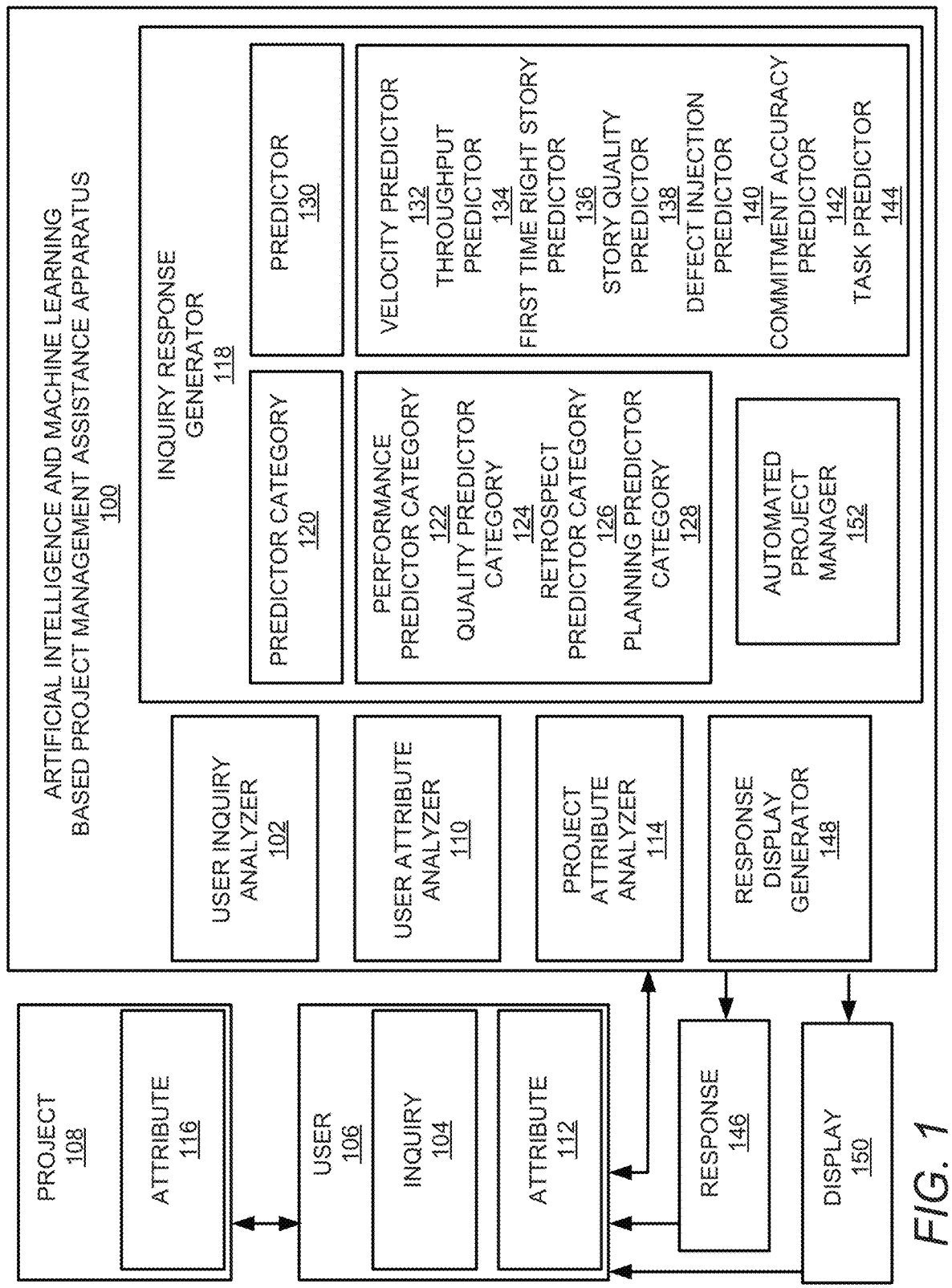
FIG. 1 illustrates a layout of an artificial intelligence and machine learning based project management assistance apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence and machine learning based project management assistance apparatuses, methods for artificial intelligence and machine learning based project management assistance, and non-transitory computer readable media having stored thereon machine readable instructions to provide artificial intelligence and machine learning based project management assistance are disclosed herein. The apparatuses, methods, and non-transitory computer readable media disclosed herein provide for artificial intelligence and machine learning based project management assistance by identifying, for a project, a predictor category from a plurality of predictor categories that include a performance predictor category, a quality predictor category, a retrospect predictor category, and a planning predictor category. Further, a predictor from a plurality of predictors may be identified based on the identified predictor category to respond to a user inquiry to facilitate project management with respect to the project. Project management may be automatically controlled based on execution of the identified predictor to meet a project criterion specified in the inquiry. For example, as disclosed herein, the project criterion may include a specified velocity, throughput, etc., associated with the project. For example, as disclosed herein, project management may be automatically controlled by analyzing aspects such as first time right story predication, story quality prediction, commitment accuracy prediction, defect injection prediction, and/or task prediction to modify resources (e.g., equipment, personnel, etc.) allocated to a project and/or timelines associated with a project to meet the project criterion specified in the inquiry.

With respect to project management, in the area of software development, one technique includes agile project management. With respect to agile projects, a variety of factors may impact the agile project management. Examples of factors include the ability of a team to meet all commitments, accuracy of estimates, how realistic is a current release plan, will existing processes solve problems as expected, team velocity, is expected increase in velocity realistic, would an upcoming release inject defects that may impact product quality, are testing scenarios effective, are requirements correctly sized, are problems correctly prioritized, etc.

With respect to the aforementioned factors associated with agile project management, burndown and burnup charts may provide an indication of whether a project target is ahead of schedule or behind schedule, and a current and/or required burnup and burndown rate. A burndown chart may provide an indication of how much work is remaining to be done in a project, whereas a burnup chart may provide an indication of how much work has been completed, and the total amount of work. Based on the usage of such burndown and burnup charts, and other available techniques, it is technically challenging to address the aforementioned factors associated with agile project management, and to predict whether the target will be met.

In order to address at least the aforementioned technical challenges, the apparatuses, methods, and non-transitory computer readable media disclosed herein may implement predictive analytics to backlog and delivery planning to develop estimates that are more accurate. A product backlog may be described as a prioritized features list including short descriptions of all functionality specified for a product. Compared to known project management techniques, the apparatuses, methods, and non-transitory computer readable media disclosed herein may also solve the technical challenges associated with interfacing of different project management systems. In this regard, the various components of the apparatuses, methods, and non-transitory computer readable media disclosed herein may provide a high level of integration that results in increased reliability of the various components by reducing errors, mismatches, and usage of memory, storage, and computing resources. Thus, the various components of the apparatuses, methods, and non-transitory computer readable media disclosed herein may provide reliable project management to meet, as disclosed herein, the project criterion specified in the inquiry. The various components of the apparatuses, methods, and non-transitory computer readable media disclosed herein may also provide reliable synchronization of the project criterion, the project attributes, and management of the project, to thereby prevent mismatches, and to thereby efficiently and reliably generate responses to the inquiry.

According to examples, the apparatuses, methods, and non-transitory computer readable media disclosed herein may implement predictive analytics to combine the data of multiple teams to build an accurate release plan and more realistic delivery goals.

According to examples, the apparatuses, methods, and non-transitory computer readable media disclosed herein may implement predictive analytics to analyze historical data of defects to increase the quality of an outcome.

According to another aspect, agile may demand a just-in-time delivery to take competitive advantage in a marketplace. However, it may be unknown whether a shippable product can be delivered by a specified date. In this regard, the apparatuses, methods, and non-transitory computer readable media disclosed herein may implement predictive analytics to predict the viability of a just-in-time delivery by analyzing historical data, capacity, and throughput.

According to another aspect, an agile user may encounter a plurality of problems to be solved. However, the agile user may not know which problem may have the most impact and should be addressed first. In this regard, the apparatuses, methods, and non-transitory computer readable media disclosed herein may implement predictive analytics to determine which problem would have the most impact and should be addressed first.

According to examples, the apparatuses, methods, and non-transitory computer readable media disclosed herein may implement predictive analytics to analyze historical data to predict the likelihood of future outcomes.

According to examples, the apparatuses, methods, and non-transitory computer readable media disclosed herein may implement optimization and simulation techniques to advice on possible outcomes to answer the question of "what should we do?", and to perform "What if" analysis.

According to examples, the apparatuses, methods, and non-transitory computer readable media disclosed herein may provide an opportunity to take preventive actions to adjust future outcomes with targets.

According to examples, the apparatuses, methods, and non-transitory computer readable media disclosed herein may enable a user (e.g., a product owner) to compare a possible future outcome with a planned product roadmap, and provide a chance to realign.

According to examples, the apparatuses, methods, and non-transitory computer readable media disclosed herein may be used any time a user needs to know something about the future, or fill in the information that is not available.

According to examples, the apparatuses, methods, and non-transitory computer readable media disclosed herein may enable a user, such as a scrum master, to foresee a scrum team's future outcomes to foster continuous improvement.

According to examples, the apparatuses, methods, and non-transitory computer readable media disclosed herein may enable a user, such as an agile coach, to assist a team to identify and solve the most impactful problem first.

According to examples, the apparatuses, methods, and non-transitory computer readable media disclosed herein may implement a plurality of predictors that may be categorized with respect to performance, quality, retrospect, and planning. In this regard, as disclosed herein, the performance category predictors may include a velocity predictor and a throughput predictor. The quality category predictors may include a first time right story predictor, a story quality predictor, and a defect injection predictor. The retrospect category predictors may include a commitment accuracy predictor and an efforts distribution predictor. The planning category predictors may include a task predictor and a release plan viability predictor.

The velocity predictor may predict velocity for a future time duration (e.g., weeks) at a project level for all teams or for a particular team. The velocity predictor may facilitate (e.g., by a product owner) the comparison of future velocity with a product roadmap. The velocity predictor may facilitate (e.g., by a scrum team) the analysis of future velocity, and operate on the analyzed future velocity. Logic associated with the velocity predictor may include determination of a cumulative velocity, and a required velocity. The cumulative velocity may be determined as a function of a total number of story points completed until a specified date. The required velocity may be determined as a sum of story points for complete product backlog, divided by a number of weeks between a first release start date and a user provided backlog target date. The required velocity, if a particular team is selected (e.g., selected team), may be determined as a sum of story points for complete product backlog for the selected team, divided by a number of weeks between a first release (for the selected team) start date and a user provided backlog target date.

The first time right story predictor may predict a first time right story percentage for future release and sprint. The first time right story predictor may implement continuous improvement to improve delivery quality, to minimize a number of defects, and to reduce efforts on fixing and testing defects. The first time right story predictor may facilitate the improvement of release and sprint processes. Logic associated with the first time right story predictor may include first time right story percentage determination as a function of a total number of user stories performed with no defect associated to them, divided by a total number of user stories performed.

For the first time right story predictor, defect to story mapping may be performed. In this regard, upon selection (e.g., actuation) of a particular plot point, the options to calibrate and analyze data may be presented. Upon selection of the calibrate option, a circular graph may be displayed to show story point-wise percentage distribution of particular stories. Upon selection of the analyze data option, stories data may be displayed with features such as filter, sort, search, etc.

The story quality predictor may predict a number of defects per story for future release and sprint. The story quality predictor may facilitate the production of a shippable product at the end of every sprint and release. The story quality predictor may provide for the improvement of story quality. Logic associated with the story quality predictor may include determination of defects per story as a function of a total number of defects associated to stories performed for a particular sprint and/or release, divided by a total number of user stories performed for a particular sprint and/or release.

For the story quality predictor, upon selecting (e.g., actuating) a particular plot point, the options to calibrate and analyze data may be presented. Upon selection of the calibrate option, a circular graph may be displayed to show severity-wise percentage distribution of particular defects. Upon selection of the analyze data option, defect data may be displayed with features such as filter, sort, search, etc.

The commitment accuracy predictor may predict commitment accuracy percentage (e.g., committed versus actual velocity) for future release and sprint. The commitment accuracy predictor may provide comparison with effort estimation accuracy (e.g., planned versus actual efforts) to analyze "what should we do?" The commitment accuracy predictor may provide assistance to a user (e.g., a scrum team) to foresee the future outcome to prioritize work accordingly. Logic associated with the commitment accuracy predictor may include determination of velocity estimation accuracy percentage as a function of total completed story points, divided by total committed story points. Further, an effort estimation accuracy percentage may be determined as a function of total planned efforts, divided by total actual efforts. For the commitment accuracy predictor, story to task mapping may be performed to determine planned and actual efforts against a story.

The throughput predictor may predict a number of work items for future weeks. The throughput predictor may foster a consistent and sustainable pace at a product and team level. Logic associated with the throughput predictor may include determination of work items closed as a function of total number of work items (e.g., stories and defects) closed during that particular week.

The defect injection predictor may predict a number of defects for future sprint and release. The defect injection predictor may assist a team to take preventive actions if prediction is beyond a permissible limit. The defect injection predictor may foster a fail fast concept of agile to shorten a feedback loop. Logic associated with the defect injection predictor may include determination of defects per sprint and/or release as a function of total number of defects raised against the stories worked upon as part of that particular sprint and/or release.

For the defect injection predictor, mapping of defect to story may be performed. For the defect injection predictor, upon selection (e.g., actuation) of a particular plot point, the options to calibrate and analyze data may be presented. Upon selection of the calibrate option, a stacked bar graph may be displayed to illustrate closed and open defects categorized by priority. Upon selection of the analyze data option, defect data may be displayed with features such as filter, sort, search, etc.

The task predictor may predict task types for stories scoped in a sprint. The task predictor may predict efforts (e.g., against tasks) needed to complete the task. The task predictor may facilitate by a user (e.g., a scrum team) improvement of the accuracy of effort estimations.

The task predictor may predict standard tasks or task types based on story type and historical data such as task title by implementing machine learning techniques.

The task predictor may predict efforts (e.g., in hours) against predicted standard tasks or task types based on story type, task type, story points assigned to the respective story, and actual efforts taken against similar tasks. In this regard, similar tasks may include tasks with the same story type, task type, and story point.

With respect to a task types predictor of the task predictor, the task types predictor may utilize input and factors such as user story type from sprint planning. The different use story types of the stories may be added to the selected sprint backlog. For the task types predictor, the historical task title under similar type of stories may be obtained from an associated database. Output of the task types predictor may include task types.

With respect to an efforts predictor of the task predictor, the efforts predictor may utilize input and factors such as user story type from sprint planning. The different use story types of the stories may be added to the selected sprint backlog. The task type may be obtained from the task types predictor and/or sprint planning. The story points may be obtained from sprint planning. In this regard, different and unique story points may be assigned to stories added to selected sprint scope. Further, the historical actual efforts against similar type of tasks may be obtained from an associated database. Output of the efforts predictor may include efforts (e.g., in hours).

The release plan viability predictor may predict viability of the release plan considering scope, quality, effort, and time. The release plan viability predictor may predict the date by when the complete scope will be delivered. The release plan viability predictor may predict the scope which is possible to be delivered by a certain date. The release plan viability predictor may predict the quality of a future release. Further, the release plan viability predictor may facilitate the analysis of the release viability in advance to take corrective actions.

The efforts distribution predictor may predict effort distribution between stories and defects for future release and/or sprint. The efforts distribution predictor may analyze whether a user (e.g., a team) is going to spend more efforts on defects than stories in the upcoming sprint and/or release.

The apparatuses, methods, and non-transitory computer readable media disclosed herein may implement adaptive planning over predictive planning.

The apparatuses, methods, and non-transitory computer readable media disclosed herein may implement an adaptive solution to support uniqueness of different users (e.g., scrum teams) and products.

The apparatuses, methods, and non-transitory computer readable media disclosed herein may predict what will happen to a product in an upcoming release (e.g., weeks or months) in advance, thus enabling a user (e.g., a product owner) to act proactively to provide a competitive advantage.

The apparatuses, methods, and non-transitory computer readable media disclosed herein may provide actionable insights to solve problems before they occur.

The apparatuses, methods, and non-transitory computer readable media disclosed herein may provide answers to questions such as "what will be the velocity", "will quality be as per standards", etc., by reducing disruption and uncertainty.

The apparatuses, methods, and non-transitory computer readable media disclosed herein may predict defects before they appear, to thus eliminate the cost of fixing defects, and increase the value of a product.

The apparatuses, methods, and non-transitory computer readable media disclosed herein may implement adaptive planning over predictive planning by giving a limited preference to adaptive planning by recognizing true status quo, and handling uncertainty at the highest level.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example artificial intelligence and machine learning based project management assistance apparatus (hereinafter also referred to as "apparatus 100").

Referring to FIG. 1, the apparatus 100 may include a user inquiry analyzer 102 that is executed by at least one hardware processor (e.g., the hardware processor 2102 of FIG. 21, or the hardware processor 2304 of FIG. 23) to ascertain an inquiry 104 by a user 106. The inquiry 104 may be related to a project 108. The user inquiry analyzer 102 may be executed on a first server (not shown) including at least one hardware processor and a memory (e.g., a memory similar to the memory 2104 of FIG. 21, and/or the non-transitory computer readable medium 2302 of FIG. 23).

A user attribute analyzer 110 that is executed by the at least one hardware processor may ascertain an attribute 112 associated with the user 106. For example, the attribute 112 may include a position of the user (e.g., a scrum master for an agile project, an agile coach an agile project, a manager, etc.), or a type of the user, such as a scrum team an agile project, a product owner of a product associated with the project 108, etc. The user attribute analyzer 110 may be executed on the first server including at least one hardware processor and a memory (e.g., a memory similar to the memory 2104 of FIG. 21, and/or the non-transitory computer readable medium 2302 of FIG. 23).

A project attribute analyzer 114 that is executed by the at least one hardware processor may ascertain an attribute 116 associated with the project 108. For example, the attribute 116 may include a type of the project (e.g., an agile-based project), specifics related to the project (e.g., start date, end date, personnel involved, location, priorities associated with tasks, status of tasks, task identifications (IDs), story IDs, sprint IDs, etc.), and generally, any information related to the project that is relevant to the analysis disclosed herein. The project attribute analyzer 114 may be executed on the first server including at least one hardware processor and a memory (e.g., a memory similar to the memory 2104 of FIG. 21, and/or the non-transitory computer readable medium 2302 of FIG. 23).

An inquiry response generator 118 that is executed by the at least one hardware processor may analyze, based on the ascertained attribute 112 associated with the user 106 and the ascertained attribute 116 associated with the project 108, the inquiry 104 by the user 106. Although the inquiry response generator 118 is illustrated in FIG. 1 as a component of the apparatus 100, alternatively, the inquiry response generator 118 may be executed on a second server (not shown) including at least one hardware processor and a memory (e.g., a memory similar to the memory 2104 of FIG. 21, and/or the non-transitory computer readable medium 2302 of FIG. 23). The second server may be disposed at a remote site compared to the first server, and various types of information associated with the components of the apparatus 100 may be exchanged, for example, over a network or otherwise, between the first and second severs.

The inquiry response generator 118 may identify, based on the analyzed inquiry 104, a predictor category 120 from a plurality of predictor categories that include a performance predictor category 122, a quality predictor category 124, a retrospect predictor category 126, and a planning predictor category 128.

The inquiry response generator 118 may identify, based on the identified predictor category 120, a predictor 130 from a plurality of predictors that include a velocity predictor 132 and a throughput predictor 134 of the performance predictor category 122, a first time right story predictor 136, a story quality predictor 138, and a defect injection predictor 140 of the quality predictor category 124, a commitment accuracy predictor 142 of the retrospect predictor category 126, and a task predictor 144 of the planning predictor category 128.

The inquiry response generator 118 may generate, based on execution of the identified predictor 130, a response 146 to the inquiry 104 by the user 106.

A response display generator 148 that is executed by the at least one hardware processor may generate, based on the generated response 146, a display 150 responsive to the inquiry 104 by the user 106. The response display generator 148 may be executed on the first server including at least one hardware processor and a memory (e.g., a memory similar to the memory 2104 of FIG. 21, and/or the non-transitory computer readable medium 2302 of FIG. 23).

According to examples, the velocity predictor 132 may be executed by the at least one hardware processor to determine velocity associated with the project 108 for a future time duration based on a cumulative velocity and a required velocity. The velocity may be described as a measure of how much work can be completed in an iteration, for example, by a team. The velocity may be measured in stories or story points. The cumulative velocity may be described as a sum of velocity completed, for example, by a team over multiple iterations within a given release. The required velocity may be described as the average velocity that the team would require in the remaining iterations of a given release, to complete at least the remaining "Must-Have" category user stories, so that a minimal marketable product may be deployed to production. In this example, the velocity predictor 132 may be executed by the at least one hardware processor to determine the cumulative velocity as a function of a total number of story points completed until a specified date, and the required velocity as a sum of story points for complete product backlog, divided by a time duration between a first release start date and a backlog target date. Story points may represent unit-less measures of relative size assigned to requirements for functionality. Story points may allow a team to focus on the size and complexity of delivering a specific piece of functionality rather than trying to perfectly estimate the duration of time required for its completion. The product backlog may be described as a prioritized list of functional and non-functional requirements that, when implemented, will deliver the project's requirements. The product backlog may be divided into proposed releases. The release start date may represent the date on which a team begins work on the committed/planned requirements of a particular release. The backlog target date may represent the date by which a list of functional and non-functional requirements listed in product backlog must be completed.

The velocity predictor 132 may implement supervised machine learning including a seasonal trend decomposition (STL) model that may represent a time series model. With respect to selection of the seasonal trend decomposition model, since correlation between an influencing variable and a target variable may not be established, the time-series model may be used with the velocity predictor 132. Further, since the variables may include sufficient data points with seasonality and trend, the seasonal trend decomposition model may be used for the velocity predictor 132. The seasonal trend decomposition model may provide for modeling of the seasonality and trend using historical data for use for future predictions.

According to examples, the first time right story predictor 136 may be executed by the at least one hardware processor to determine a first time right story value for future release and sprint. A first time right story may be described as a story that gets completed and deployed into production without having a single defect logged against it. A higher first time right story may indicate a higher product quality. Future release may be described as a release planned to start in a future date with planned scope to complete. A future sprint (future iteration) may be described as an iteration planned to start in a future date with planned scope to complete. In this example, the first time right story predictor 136 may be executed by the at least one hardware processor to determine the first time right story value as a function of a total number of user stories performed with no defect, divided by a total number of user stories performed. User stories performed may be described as a number of user stories completed by a team.

The first time right story predictor 136 may implement supervised machine learning including a single exponential smoothing model that may represent a time series model. With respect to selection of the single exponential smoothing model, since correlation between an influencing variable and a target variable may not be established, the time-series model may be used with the first time right story predictor 136. Further, since the variables may not include sufficient data points, the single exponential smoothing model may be used for the first time right story predictor 136. The single exponential smoothing model may provide a future expected value with more weightage to recent values.

According to examples, the story quality predictor 138 may be executed by the at least one hardware processor to determine a number of defects per story for future release and sprint. Defects per story may be described as an approximate number of defects to be raised against a story. In this example, the story quality predictor 138 may be executed by the at least one hardware processor to determine the number of defects per story as a function of a total number of defects associated to stories performed for at least one of a particular sprint or release, divided by a total number of stories performed for the at least one of the particular sprint or release.

The story quality predictor 138 may implement supervised machine learning including a single exponential smoothing model that may represent a time series model. With respect to selection of the single exponential smoothing model, since correlation between an influencing variable and a target variable may not be established, the time-series model may be used with the story quality predictor 138. Further, since the variables may not include sufficient data points, the single exponential smoothing model may be used for the story quality predictor 138. The single exponential smoothing model may provide a future expected value with more weightage to recent values.

According to examples, the commitment accuracy predictor 142 may be executed by the at least one hardware processor to determine a commitment accuracy value for future release and sprint. Commitment accuracy value may be described as a value (e.g., (total completed story points/ total committed story points)*100) that indicates accuracy of the commitment of an iteration. In this example, the commitment accuracy predictor 142 may be executed by the at least one hardware processor to determine the commitment accuracy value as a function of a velocity estimation accuracy value determined as a function of total completed story points, divided by total committed story points, and an effort estimation accuracy value determined as a function of total planned efforts, divided by total actual efforts. Total completed story points may be described as a sum of story points of stories completed thus far by the team. Total committed stories may be described as a sum of story points of stories tagged for remaining iterations of a given release. Total planned efforts may be described as a sum or efforts (e.g., in hours or days) available for a team for a given future iteration or release. Total actual efforts may be described as a sum or effort (e.g., in hours or days) spent by a team against a closed iteration or release.

The commitment accuracy predictor 142 may implement supervised machine learning including a single exponential smoothing model that may represent a time series model. With respect to selection of the single exponential smoothing model, since correlation between an influencing variable and a target variable may not be established, the time-series model may be used with the commitment accuracy predictor 142. Further, since the variables may not include sufficient data points, the single exponential smoothing model may be used for the commitment accuracy predictor 142. The single exponential smoothing model may provide a future expected value with more weightage to recent values.

According to examples, the throughput predictor 134 may be executed by the at least one hardware processor to determine a number of work items for a future time duration. Work Items may be described as user stories or defects. The future time duration may be described as a duration for which a predictor may predict values (e.g., twelve weeks in the case of the velocity predictor 132). In this example, the throughput predictor 134 may be executed by the at least one hardware processor to determine the number of work items as a function of a total number of work items closed during a specified time duration. The total number of work items closed may be described as a number of stories or defects completed by the team. The specified time duration may be described as a specific duration for which progress or a measure is determined (e.g., one week in case of the throughput predictor 134).

The throughput predictor 134 may implement supervised machine learning including a seasonal trend decomposition model that may represent a time series model. With respect to selection of the seasonal trend decomposition model, since correlation between an influencing variable and a target variable may not be established, the time-series model may be used with the throughput predictor 134. Further, since the variables may include sufficient data points with seasonality and trend, the seasonal trend decomposition model may be used for the throughput predictor 134. The seasonal trend decomposition model may provide for modeling of the seasonality and trend using historical data for use for future predictions.

According to examples, the defect injection predictor 140 may be executed by the at least one hardware processor to determine a number of defects for future sprint and release. In this example, the defect injection predictor 140 may be executed by the at least one hardware processor to determine the number of defects for future sprint and release as a function of a total number of defects raised against stories worked upon as part of a corresponding sprint and release. The total number of defects raised against stories worked upon may be described as a total number of defects raised against stories completed by a team thus far in an ongoing release or sprint.

The defect injection predictor 140 may implement supervised machine learning including a single exponential smoothing model that may represent a time series model. With respect to selection of the single exponential smoothing model, since correlation between an influencing variable and a target variable may not be established, the time-series model may be used with the defect injection predictor 140. Further, since the variables may not include sufficient data points, the single exponential smoothing model may be used for the defect injection predictor 140. The single exponential smoothing model may provide a future expected value with more weightage to recent values.

According to examples, the task predictor 144 may be executed by the at least one hardware processor to determine task types for stories scoped in a sprint. Task types may be described as types of tasks created under a story to accomplish an associated design, development, unit testing, integration testing, functional testing, deployment, etc. Stories scoped may be described as stories planned/committed to be delivered in a particular iteration. In this example, the task predictor 144 may be executed by the at least one hardware processor to determine the task types for stories scoped in the sprint as a function of different use story types of stories added to selected sprint backlog. User story type may be described as types of stories, such as functional and non-functional. Selected sprint backlog may be described as a prioritized list of requirements, required to be implemented to meet a sprint goal.

The task predictor 144 may implement supervised machine learning including a single exponential smoothing model that may represent a time series model. With respect to selection of the single exponential smoothing model, since correlation between an influencing variable (e.g., story points) and a target variable (e.g., completed task) may not be established, the time-series model may be used with the task predictor 144. Further, since the variables may not include sufficient data points, the single exponential smoothing model may be used for the task predictor 144. The single exponential smoothing model may provide a future expected value with more weightage to recent values. Alternatively or additionally, the task predictor 144 may implement unsupervised machine learning including a keywords and K-nearest neighbor (KNN) model that may represent a multiclass classification model. With respect to selection of the keywords and KNN model, the task title and task description data for task type may be labeled, for example, by using the keywords and KNN model. The keywords and KNN model may provide for classification of the task types without human intervention.

An automated project manager 152 that is executed by the at least one hardware processor may control, based on the execution of the identified predictor 130, management of the project 108 to meet a project criterion specified in the inquiry. For example, the project criterion may include a specified velocity, throughput, etc., associated with the project 108. For example, the automated project manager 152 may automatically control management of the project 108 by analyzing aspects such as first time right story predication, story quality prediction, commitment accuracy prediction, defect injection prediction, and/or task prediction to modify resources (e.g., equipment, personnel, etc.) allocated to the project 108, and/or timelines associated with the project 108 to meet the project criterion specified in the inquiry 104. For example, the user 106 may specify a velocity and/or throughput requirement associated with the project 108. In this regard, the automated project manager 152 may automatically control management of the project 108 by analyzing whether a first time right story predication value, a story quality prediction value, a commitment accuracy prediction value, a defect injection prediction value, and/or a task prediction value meet respective thresholds associated with these values. Based on a determination that the respective thresholds are not met, the automated project manager 152 may modify resources (e.g., equipment, personnel, etc.) allocated to the project 108, and/or timelines associated with the project 108 to meet the project criterion specified in the inquiry 104. The automated project manager 152 may be executed on the first server including at least one hardware processor and a memory (e.g., a memory similar to the memory 2104 of FIG. 21, and/or the non-transitory computer readable medium 2302 of FIG. 23).

Figure 2:
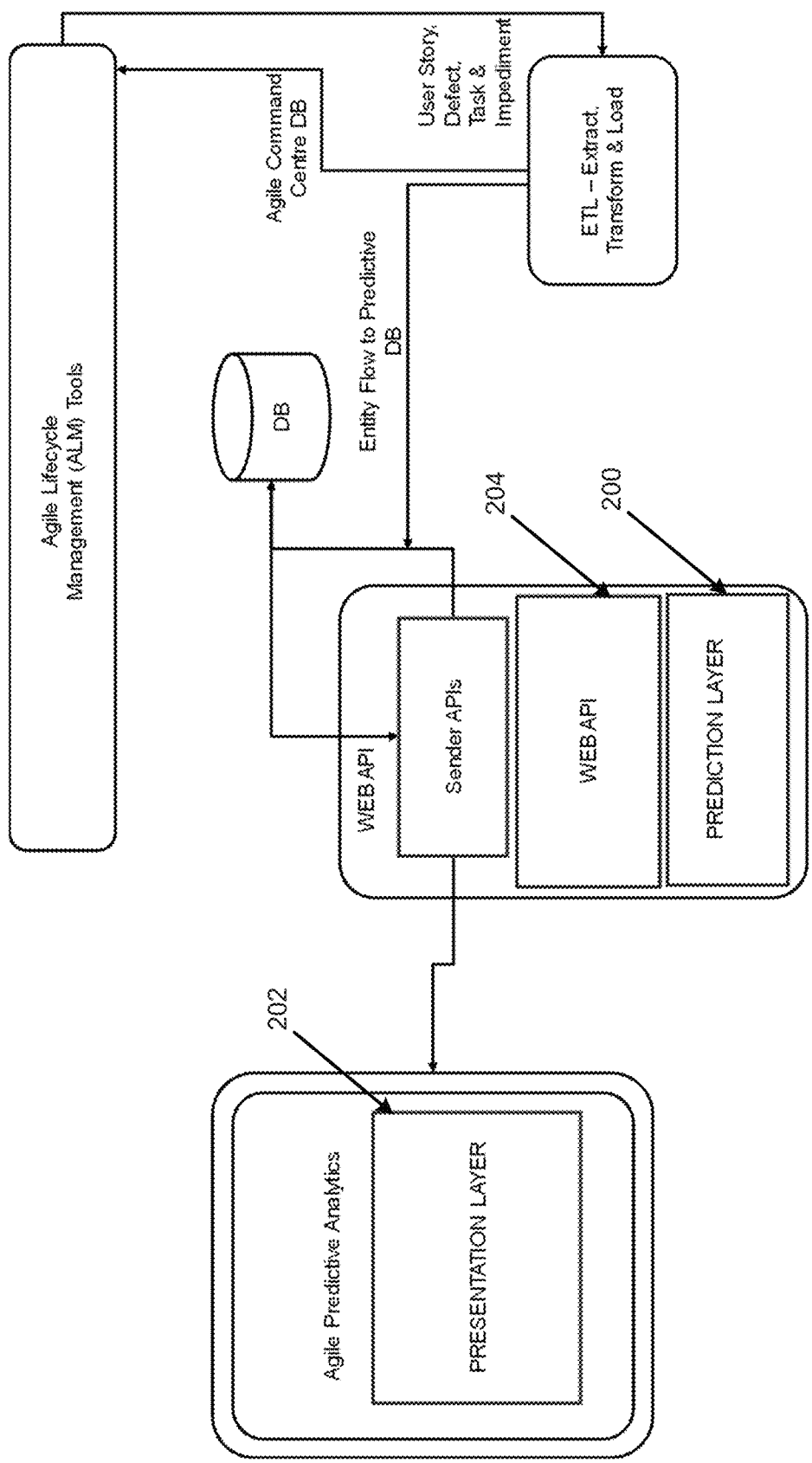
FIG. 2 illustrates a technical architecture of the artificial intelligence and machine learning based project management assistance apparatus of FIG. 1 in accordance with an example of the present disclosure.

FIG. 2 illustrates a technical architecture of the apparatus 100 in accordance with an example of the present disclosure.

Referring to FIG. 2, the prediction layer 200 may be implemented, based, for example, on JIRA™, Team Foundation Server (TFS), Rational Team Concert (RTC), etc. (e.g., the agile lifecycle management (ALM) tools). The presentation layer at 202 may be implemented by using, for example, ASP.NET™ 4.5, ANGULAR.JS™, a Structured Query Language (SQL) server, HIGHCHART™, Web API, C#, etc. The WEB Application Programming Interface (API) at 204 may be implemented by using, for example, ASP.NET 4.5, C#, etc.

Figure 3:
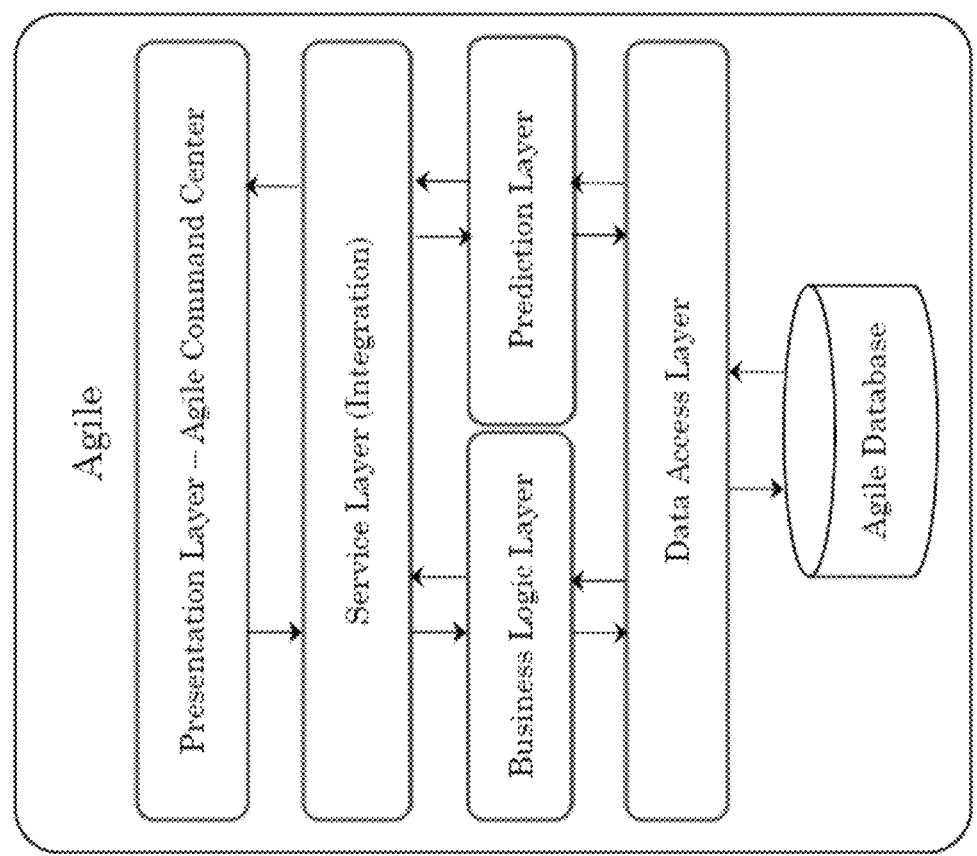
FIG. 3 illustrates an application architecture of the artificial intelligence and machine learning based project management assistance apparatus of FIG. 1 in accordance with an example of the present disclosure.

FIG. 3 illustrates an application architecture of the apparatus 100 in accordance with an example of the present disclosure.

Referring to FIG. 3, the application architecture may represent various layers that may be used to develop the apparatus 100. The presentation layer may represent the agile command center, and may be implemented by using, for example, Angular JS, .NET Framework, HyperText Markup Language (HTML), Cascading Style Sheets (CSS), etc. The service layer may provide for integration of the different functionalities of the apparatus 100, and may be implemented by using, for example, Web API, .NET Framework, C#, etc. The business logic layer may be implemented by using, for example, .NET Framework, C#, Enterprise Library, etc. The prediction layer may be implemented by using, for example, R.NET, etc. The data access layer may be implemented by using, for example, .NET Framework, C#, Language-Integrated Query (LINQ), Entity Framework, etc. The agile database may be implemented by using, for example, a SQL server.

Figure 4:
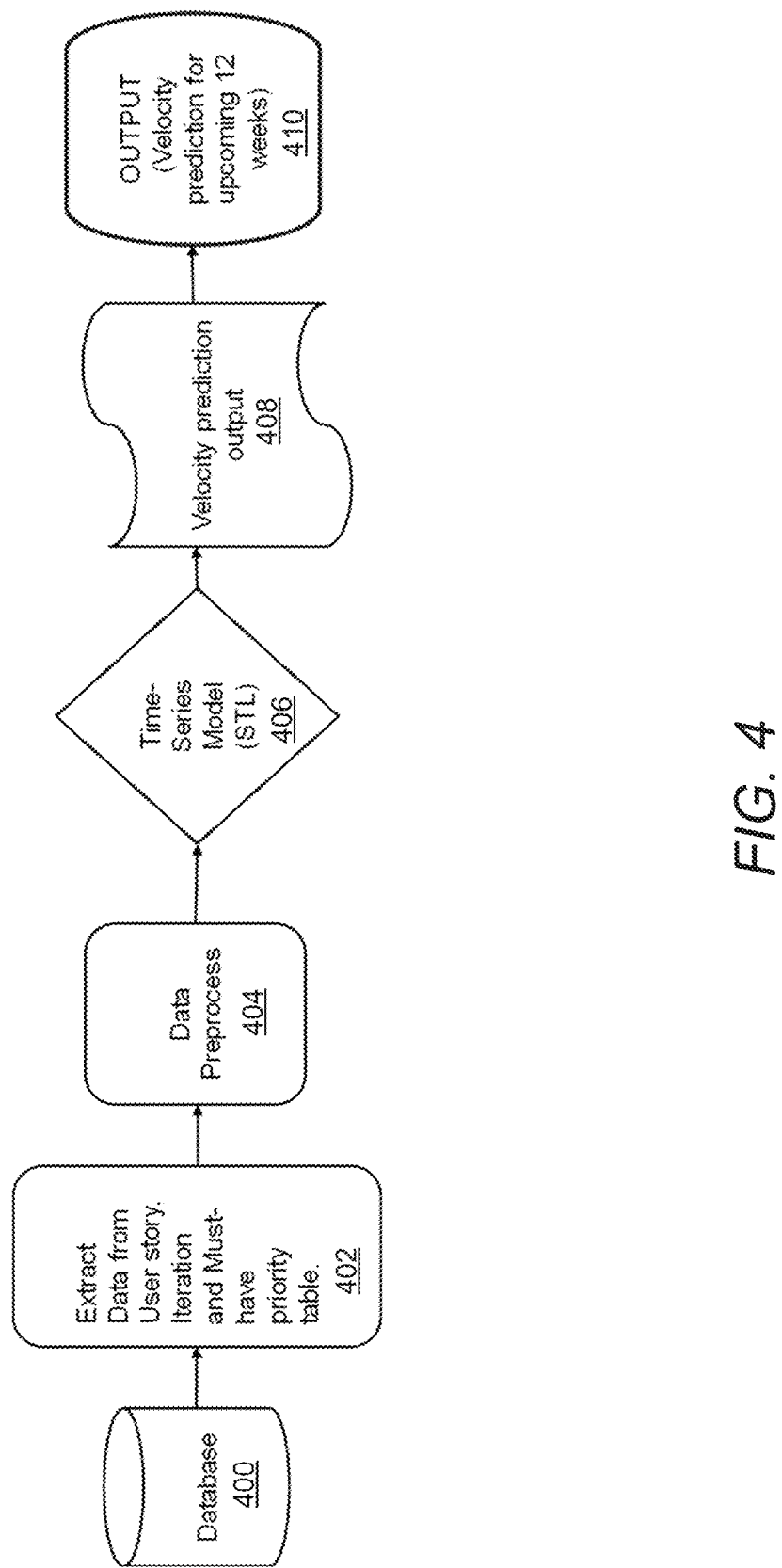
FIG. 4 illustrates a weekly velocity prediction flowchart for a velocity predictor of the artificial intelligence and machine learning based project management assistance apparatus of FIG. 1 in accordance with an example of the present disclosure.

FIG. 4 illustrates a weekly velocity prediction flowchart for the velocity predictor 132 of the apparatus 100 in accordance with an example of the present disclosure.

Referring to FIG. 4, as disclosed herein, the velocity predictor 132 may predict velocity for a future time duration (e.g., weeks) at a project level for all teams or for a particular team. The velocity predictor 132 may facilitate (e.g., by a product owner) the comparison of future velocity with a product roadmap. The velocity predictor 132 may facilitate (e.g., by a scrum team) the analysis of future velocity, and operate on the analyzed future velocity. Logic associated with the velocity predictor 132 may include determination of a cumulative velocity, and a required velocity. The cumulative velocity may be determined as a function of a total number of story points completed until a specified date. The required velocity may be determined as a sum of story points for complete product backlog, divided by a number of weeks between a first release start date and a user provided backlog target date. The required velocity, if a particular team is selected (e.g., selected team), may be determined as a sum of story points for complete product backlog for the selected team, divided by a number of weeks between a first release (for the selected team) start date and a user provided backlog target date.

At block 402, the velocity predictor 132 may extract, from the database at 400, the data from a user story table for delivery entities with a specified duration (e.g., at-least six weeks) of actual data. The velocity predictor 132 may determine a project start date by the earliest release start date from an iteration table, and a must-have condition from a must-have priority table to plot a variant charts.

At block 404, the velocity predictor 132 may determine weekly completed story points. Further, the velocity predictor 132 may determine weekly required story points.

At block 406, the velocity predictor 132 may predict the future weekly velocity (e.g., completed story points) using, for example, a seasonal trend decomposition (STL model) for a specified duration (e.g., next 12 weeks). Absent establishment of the correlation between the various factors and target variable, time-series may be selected.

At block 408, an output of the velocity predictor 132 as shown at 410 may include a graphical representation of historical story-point velocity, and a future forecast, along with lower and upper limits. In this regard, according to examples, prediction may be restricted to a specified time duration (e.g., upcoming twelve weeks), as accuracy of prediction may be reduced for a higher time period.

Figure 5:
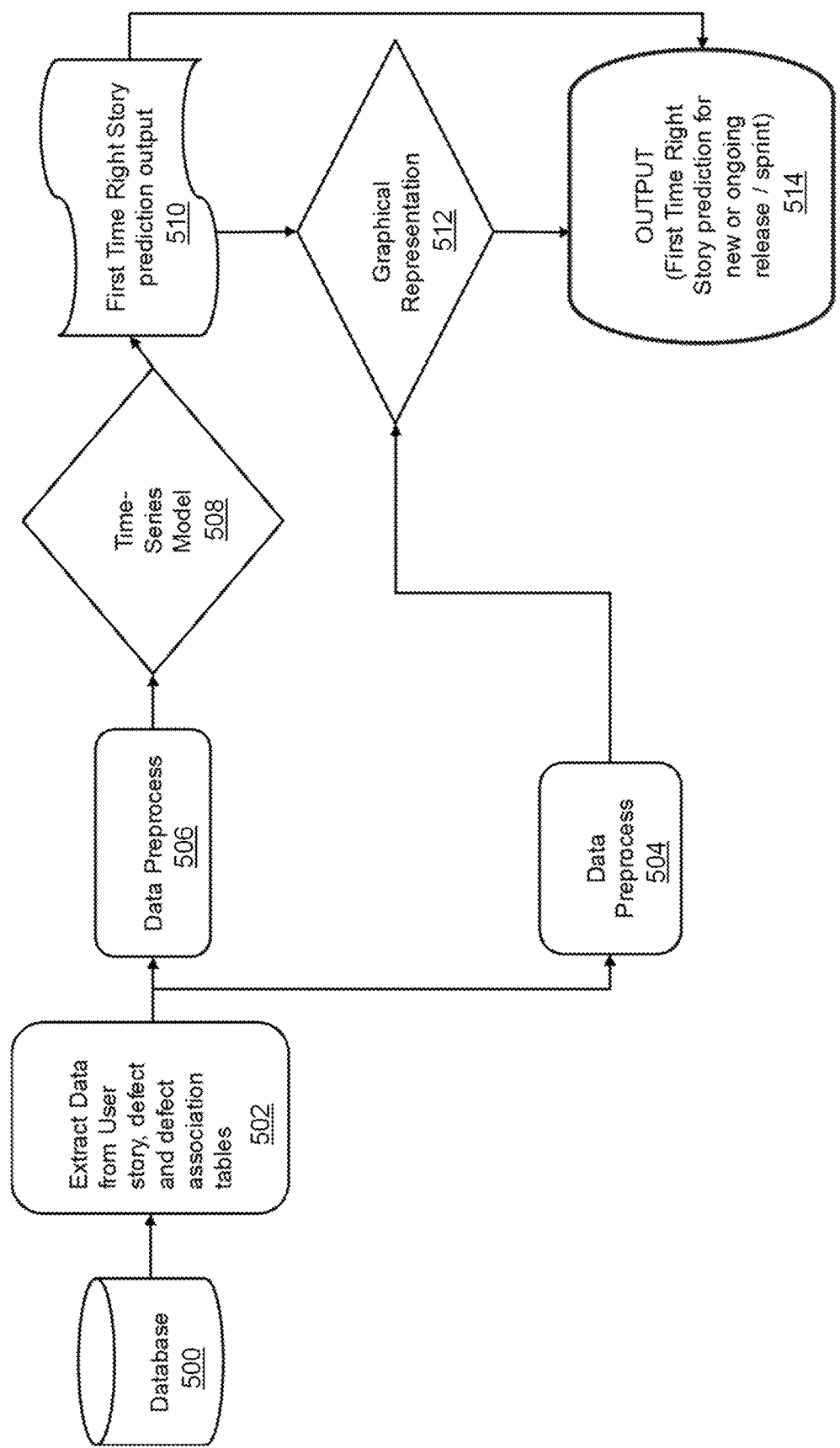
FIG. 5 illustrates a first time right story predictor flowchart for a first time right story predictor of the artificial intelligence and machine learning based project management assistance apparatus of FIG. 1 in accordance with an example of the present disclosure.

FIG. 5 illustrates a first time right story predictor flowchart for the first time right story predictor 136 of the apparatus 100 in accordance with an example of the present disclosure.

Referring to FIG. 5, the first time right story predictor 136 may predict a first time right story percentage for future release and sprint. The first time right story predictor 136 may implement continuous improvement to improve delivery quality, to minimize a number of defects, and to reduce efforts on fixing and testing defects. The first time right story predictor 136 may facilitate the improvement of release and sprint processes. Logic associated with the first time right story predictor 136 may include first time right story percentage determination as a function of a total number of user stories performed with no defect associated to them, divided by a total number of user stories performed. For the first time right story predictor 136, defect to story mapping may be performed. In this regard, upon selection (e.g., actuation) of a particular plot point, the options to calibrate and analyze data may be presented. Upon selection of the calibrate option, a circular graph may be displayed to show story point-wise percentage distribution of particular stories. Upon selection of the analyze data option, stories data may be displayed with features such as filter, sort, search, etc.

At block 502, the first time right story predictor 136 may ascertain, from the database at 500, data from user story, defect, and defect association tables for delivery entities that have completed a specified number of releases (e.g., at least two releases).

At block 504, the first time right story predictor 136 may extract the information of individual stories with zero defect.

At block 506, the first time right story predictor 136 may perform first time right story percentage determination as a function of a total number of user stories performed till date for release or sprint with no defect associated to them, divided by a total number of user stories performed till date for release or sprint.

At block 508, the first time right story predictor 136 may predict a first time right story percentage (e.g., stories without defect association) using, for example, an exponential smoothing model to predict for the next release and/or sprint.

At block 510, an output of the first time right story prediction may be generated, and further displayed in a graphical representation at block 512. For example, at block 512, upon selection (e.g., actuation) of a particular plot point, the options to calibrate and analyze data may be presented. Upon selection of the calibrate option, at block 514, a circular graph may be displayed to show story point-wise percentage distribution of first time right stories of that particular data point. Upon selection of the analyze data option, stories data may be displayed with features such as filter, sort, search, etc. The stories data may be related to first time right stories of that particular data point.

Figure 6:
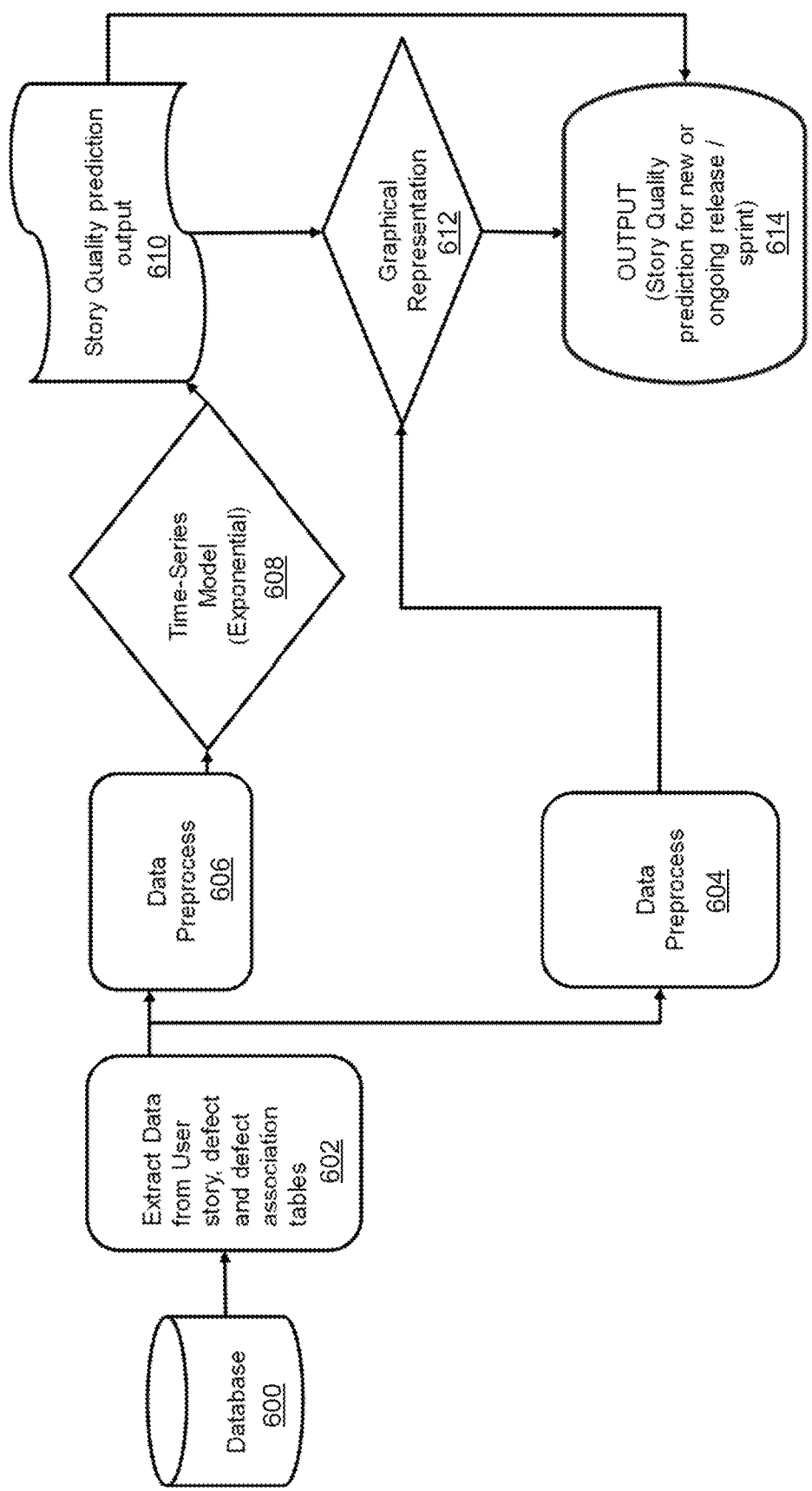
FIG. 6 illustrates a defect per story prediction flowchart for a story quality predictor of the artificial intelligence and machine learning based project management assistance apparatus of FIG. 1 in accordance with an example of the present disclosure.

FIG. 6 illustrates a defect per story prediction flowchart for a story quality predictor 138 of the apparatus 100 in accordance with an example of the present disclosure.

Referring to FIG. 6, the story quality predictor 138 may predict a number of defects per story for future release and sprint. The story quality predictor 138 may facilitate the production of a shippable product at the end of every sprint and release. The story quality predictor 138 may provide for the improvement of story quality. Logic associated with the story quality predictor may include determination of defects per story as a function of a total number of defects associated to stories performed for a particular sprint and/or release, divided by a total number of user stories performed for a particular sprint and/or release. For the story quality predictor 138, upon selecting (e.g., actuating) a particular plot point, the options to calibrate and analyze data may be presented. Upon selection of the calibrate option, a circular graph may be displayed to show severity-wise percentage distribution of particular defects. Upon selection of the analyze data option, defect data may be displayed with features such as filter, sort, search, etc.

At block 602, the story quality predictor 138 may extract, from the database at 600, data from user story, defect, and defect association tables for delivery entities that have completed a specified number of releases (e.g., at least two releases).

At block 604, the story quality predictor 138 may extract the information of individual defect for particular release and/or sprint.

At block 606, the story quality predictor 138 may determine a defect per story ratio as a function of a total number of defects until a specified date for release and/or sprint, divided by a total number of user stories completed until the specified date for release and/or sprint.

At block 608, the story quality predictor 138 may determine (e.g., predict) a defect per story ratio using, for example, an exponential smoothing model for a next release and/or sprint.

At block 610, an output of the story quality prediction may be generated, and further displayed in a graphical representation at block 612. For example, at block 612, upon selection (e.g., actuation) of a particular plot point, the options to calibrate and analyze data may be presented. Upon selection of the calibrate option, at block 614, a severity wise percentage distribution of defects, and/or a root cause wise percentage distribution of defects may be displayed. Upon selection of the analyze data option, data related to defects of that particular data point (e.g., release and/or sprint) may be displayed.

Figure 7:
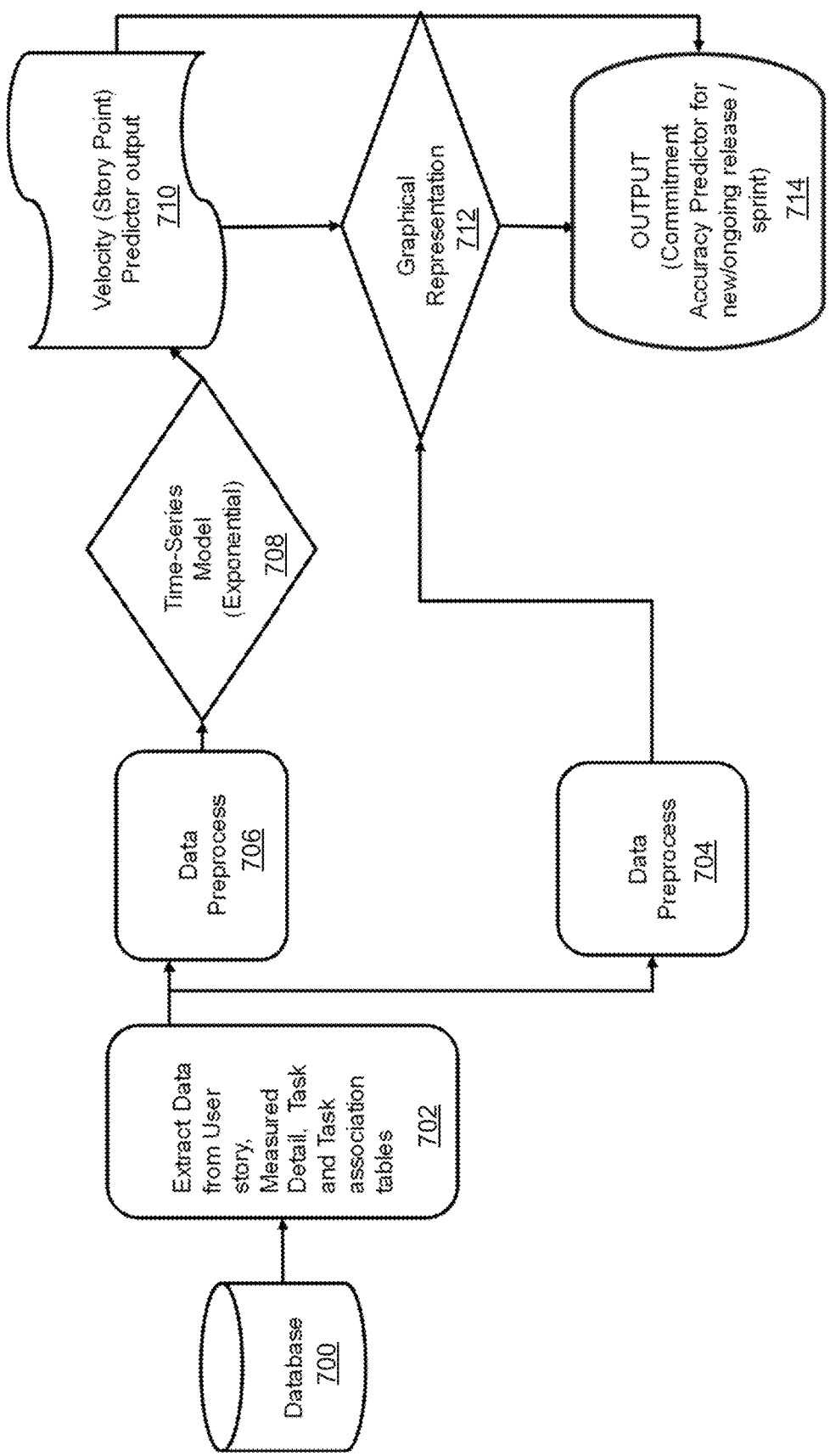
FIG. 7 illustrates a velocity and efforts prediction flowchart for a commitment accuracy predictor of the artificial intelligence and machine learning based project management assistance apparatus of FIG. 1 in accordance with an example of the present disclosure.

FIG. 7 illustrates a velocity and efforts prediction flowchart for a commitment accuracy predictor of the apparatus 100 in accordance with an example of the present disclosure.

Referring to FIG. 7, the commitment accuracy predictor 142 may predict commitment accuracy percentage (e.g., committed versus actual velocity) for future release and/or sprint. The commitment accuracy predictor 142 may provide comparison with effort estimation accuracy (e.g., planned versus actual efforts) to analyze "what should we do?" The commitment accuracy predictor 142 may provide assistance to a user (e.g., a scrum team) to foresee the future outcome to prioritize work accordingly. Logic associated with the commitment accuracy predictor 142 may include determination of velocity estimation accuracy percentage as a function of total completed story points, divided by total committed story points. Further, an effort estimation accuracy percentage may be determined as a function of total planned efforts, divided by total actual efforts. For the commitment accuracy predictor 142, story to task mapping may be performed to determine planned and actual efforts against a story.

At block 702, the commitment accuracy predictor 142 may extract, from the database at 700, data from user story, measured detail, task, and task association tables for delivery entities that completed a specified number of releases (e.g., at least two releases).

At block 704, the commitment accuracy predictor 142 may determine a task estimation as a function of a total number of hours committed to a task for a selected release and/or sprint, divided by a total number of hours actually required to complete the task for the selected release and/or sprint.

At block 706, the commitment accuracy predictor 142 may determine a velocity with respect to story point estimation as a function of a total number of story points completed until a specified date (e.g., a current date) selected for release and/or sprint, divided by a total number of story points committed until the specified date (e.g., the current date) selected for release and/or sprint.

At block 708, the commitment accuracy predictor 142 may predict defect injection using, for example, an exponential smoothing model for a next release and/or sprint.

At block 710, an output of the velocity (story point) predictor may be generated, and further displayed in a graphical representation at block 712. For example, at block 712, the velocity estimate line chart may be superimposed with task estimation (story size point bar chart) for that particular data point release and/or sprint. The output at block 714 may include an output of the commitment accuracy predictor 142 for new and/or ongoing release and/or sprint.

Figure 8:
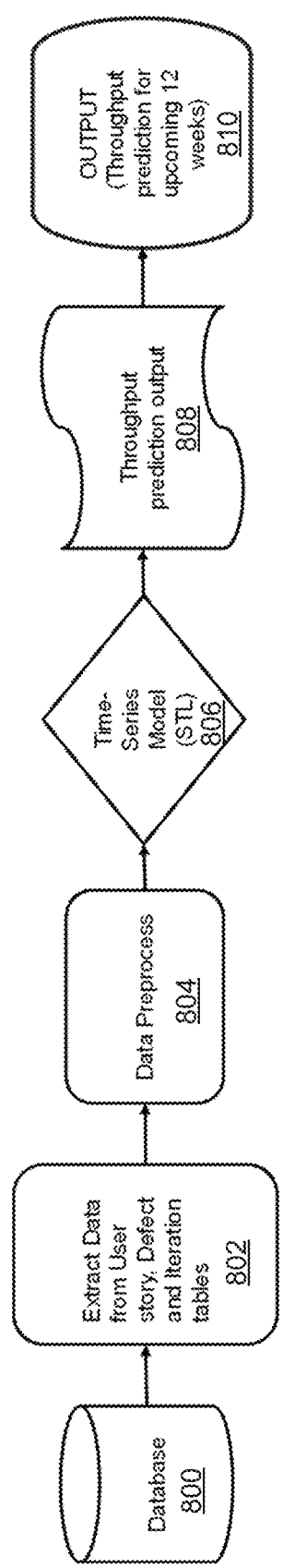
FIG. 8 illustrates a weekly work-item including stories and defects prediction flowchart for a throughput predictor of the artificial intelligence and machine learning based project management assistance apparatus of FIG. 1 in accordance with an example of the present disclosure.

FIG. 8 illustrates a weekly work-item including stories and defects prediction flowchart for a throughput predictor of the apparatus 100 in accordance with an example of the present disclosure.

Referring to FIG. 8, the throughput predictor 134 may predict a number of work items for future weeks. The throughput predictor 134 may foster a consistent and sustainable pace at a product and team level. Logic associated with the throughput predictor 134 may include determination of work items closed as a function of total number of work items (e.g., stories and defects) closed during that particular week.

At block 802, the throughput predictor 134 may extract, from the database at 800, data from a user story and defect table for delivery entities with a specified number of weeks of data (e.g., at-least six weeks of data).

At block 804, the throughput predictor 134 may determine work items closed as a function of total number of work items (e.g., stories and defects) closed during that particular week.

At block 806, the throughput predictor 134 may predict the future weekly items closed (e.g., completed stories and effects) using, for example, a seasonal trend decomposition model for a specified time duration (e.g., next twelve weeks).

At block 808, an output of the throughput predictor 134 may be generated, and further displayed at block 810. For example, at block 810, the output may include a graphical representation of historical items (e.g., stories and defect), and closed and future forecast, along with lower and upper limits. The output may also include a team-wise comparison line.

Figure 9:
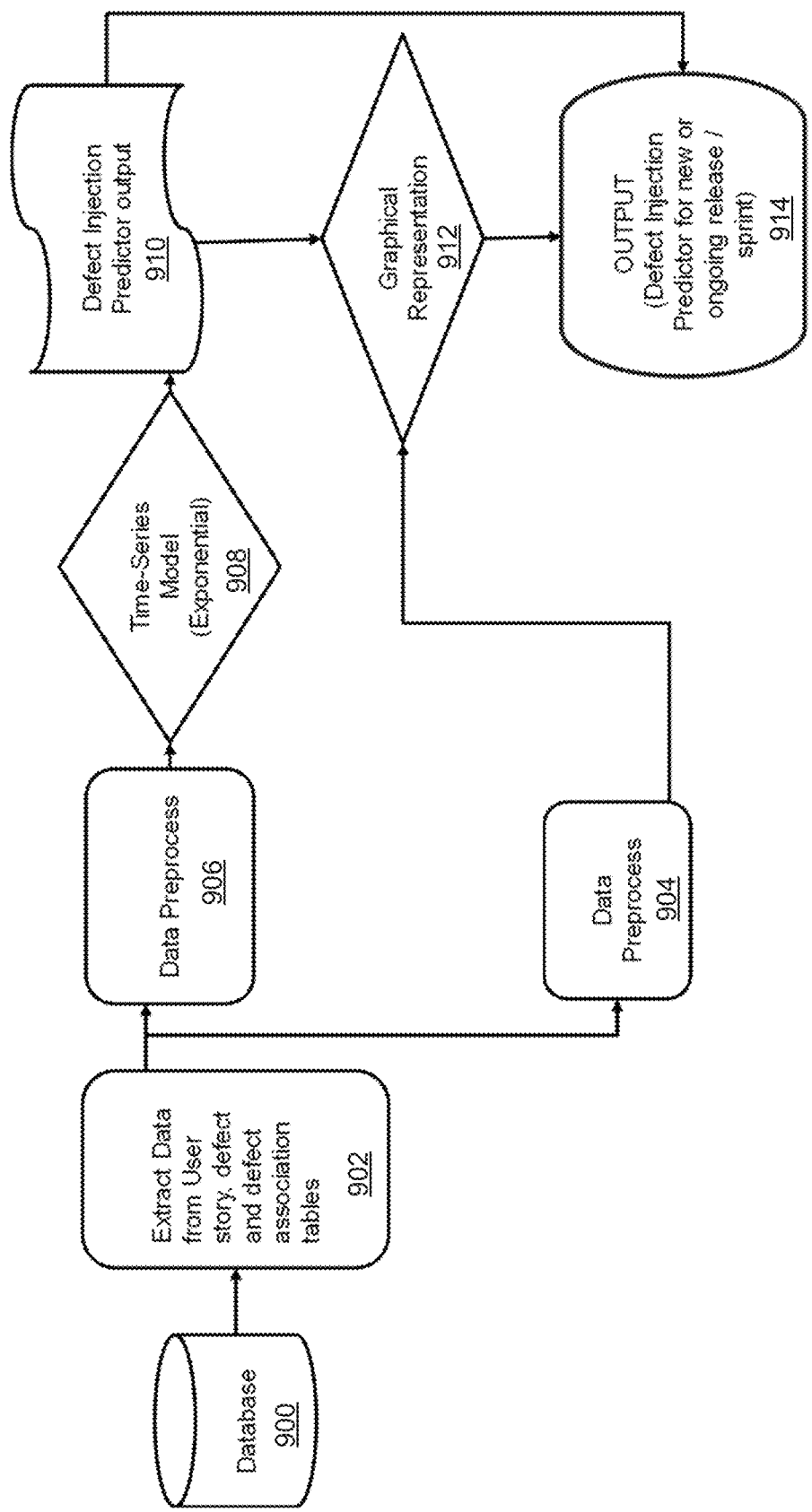
FIG. 9 illustrates a defect per release and sprint prediction flowchart for a defect injection predictor of the artificial intelligence and machine learning based project management assistance apparatus of FIG. 1 in accordance with an example of the present disclosure.

FIG. 9 illustrates a defect per release and sprint prediction flowchart for a defect injection predictor of the apparatus 100 in accordance with an example of the present disclosure.

Referring to FIG. 9, the defect injection predictor 140 may predict a number of defects for future sprint and release. The defect injection predictor 140 may assist a team to take preventive actions if prediction is beyond a permissible limit. The defect injection predictor 140 may foster a fail fast concept of agile to shorten a feedback loop. Logic associated with the defect injection predictor 140 may include determination of defects per sprint and/or release as a function of total number of defects raised against the stories worked upon as part of that particular sprint and/or release. For the defect injection predictor 140, mapping of defect to story may be performed. For the defect injection predictor 140, upon selection (e.g., actuation) of a particular plot point, the options to calibrate and analyze data may be presented. Upon selection of the calibrate option, a stacked bar graph may be displayed to illustrate closed and open defects categorized by priority. Upon selection of the analyze data option, defect data may be displayed with features such as filter, sort, search, etc.

At block 902, the defect injection predictor 140 may extract, from the database at 900, data from user story, defect, and defect association tables for delivery entities that have completed a specified number (e.g., at least two) releases.

At block 904, the defect injection predictor 140 may extract the information of individual defects for a particular release and/or sprint.

At block 906, the defect injection predictor 140 may determine defect injection (e.g., as a numeric value) as a function of a total number of defects for release and/or sprint.

At block 908, the defect injection predictor 140 may predict defect injection using, for example, an exponential smoothing model for a next release and/or sprint.

At block 910, an output of the defect per release and sprint prediction may be generated, and further displayed in a graphical representation at block 912. For example, at block 912, upon selection (e.g., actuation) of a particular data point, the options to calibrate and analyze data may be presented. Upon selection of the calibrate option, at block 914, a stacked column chart for a selected data point determined as a function of open, closed, and rejected defects may be displayed. Upon selection of the analyze data option, data related to defects of that particular data point (e.g., release and/or sprint) may be displayed.

Figure 10:
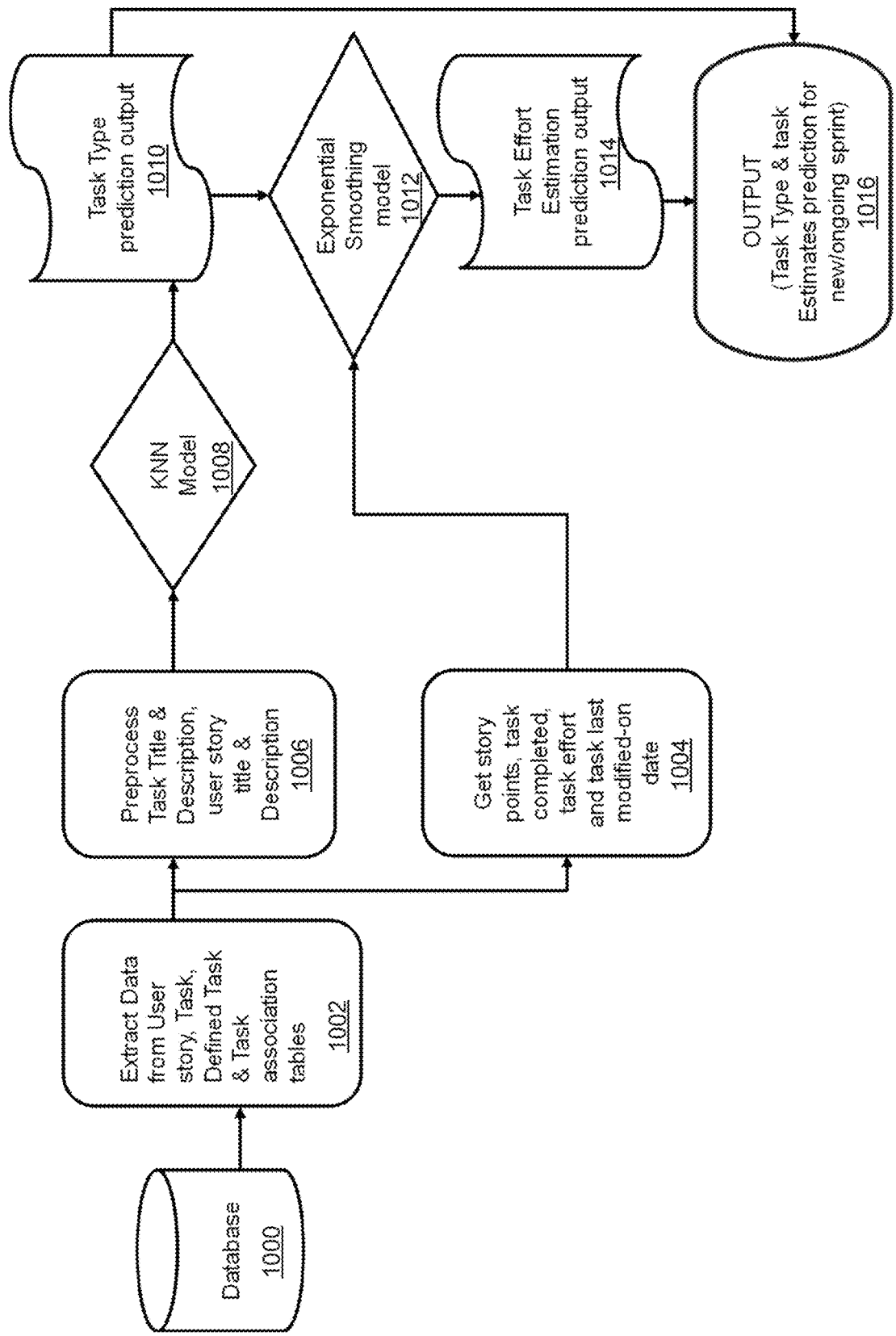
FIG. 10 illustrates a task types and efforts prediction flowchart for a task predictor of the artificial intelligence and machine learning based project management assistance apparatus of FIG. 1 in accordance with an example of the present disclosure.

FIG. 10 illustrates a task types and efforts prediction flowchart for a task predictor of the apparatus 100 in accordance with an example of the present disclosure.

Referring to FIG. 10, the task predictor 144 may predict task types for stories scoped in a sprint. The task predictor 144 may predict efforts (e.g., against tasks) needed to complete the task. The task predictor 144 may facilitate by a user (e.g., a scrum team) improvement of the accuracy of effort estimations. The task predictor 144 may predict standard tasks or task types based on story type and historical data such as task title by implementing machine learning techniques. The task predictor 144 may predict efforts (e.g., in hours) against predicted standard tasks or task types based on story type, task type, story points assigned to the respective story, and actual efforts taken against similar tasks. In this regard, similar tasks may include tasks with the same story type, task type, and story point.

With respect to the task types predictor of the task predictor 144, the task types predictor may utilize input and factors such as user story type from sprint planning. The different use story types of the stories may be added to the selected sprint backlog. For the task types predictor, the historical task title under similar type of stories may be obtained from an associated database. Output of the task types predictor may include task types.

With respect to the efforts predictor of the task predictor 144, the efforts predictor may utilize input and factors such as user story type from sprint planning. The different use story types of the stories may be added to the selected sprint backlog. The task type may be obtained from the task types predictor and/or sprint planning. The story points may be obtained from sprint planning. In this regard, different and unique story points may be assigned to stories added to selected sprint scope. Further, the historical actual efforts against similar type of tasks may be obtained from an associated database. Output of the efforts predictor may include efforts (e.g., in hours).

At block 1002, the task predictor 144 may extract, from the database at 1000, data from user story, task, defined task, and task associated tables for delivery entities that completed a specified number of sprints (e.g., at least two sprints). A task associated table may include data association for sprint and release.

At block 1004, the task predictor 144 may prepare data to forecast the task estimate hours against the story points.

At block 1006, the task predictor 144 may preprocess task title and description, user story title and description by removal of stop words, stemming, tokenizing, normalizing cases, and removal of special characters.

At block 1008, the task predictor 144 may label the task title and task description for task type, for example, by using keywords with K-nearest neighbors. A keywords list may be provided, for example, by a domain expert. The task predictor 144 may retrain the K-nearest neighbors model by task type data entered, where the task type data may be stored in defined task table.

At block 1010, an output of the task type prediction may be generated.

At block 1012, exponential smoothing may be performed on the output of the task type prediction generated at block 1010. In this regard, since the correlation between the influencing variable (e.g., story points) and target variable (e.g., completed task) is not established, time-series may be selected. Further, since the variable includes limited data points, the exponential smoothing model may be used.

At block 1014, task effort estimation prediction output may be generated.

At block 1016, the output may include task type and task estimates prediction for new and/or ongoing sprint.

Figure 11A:
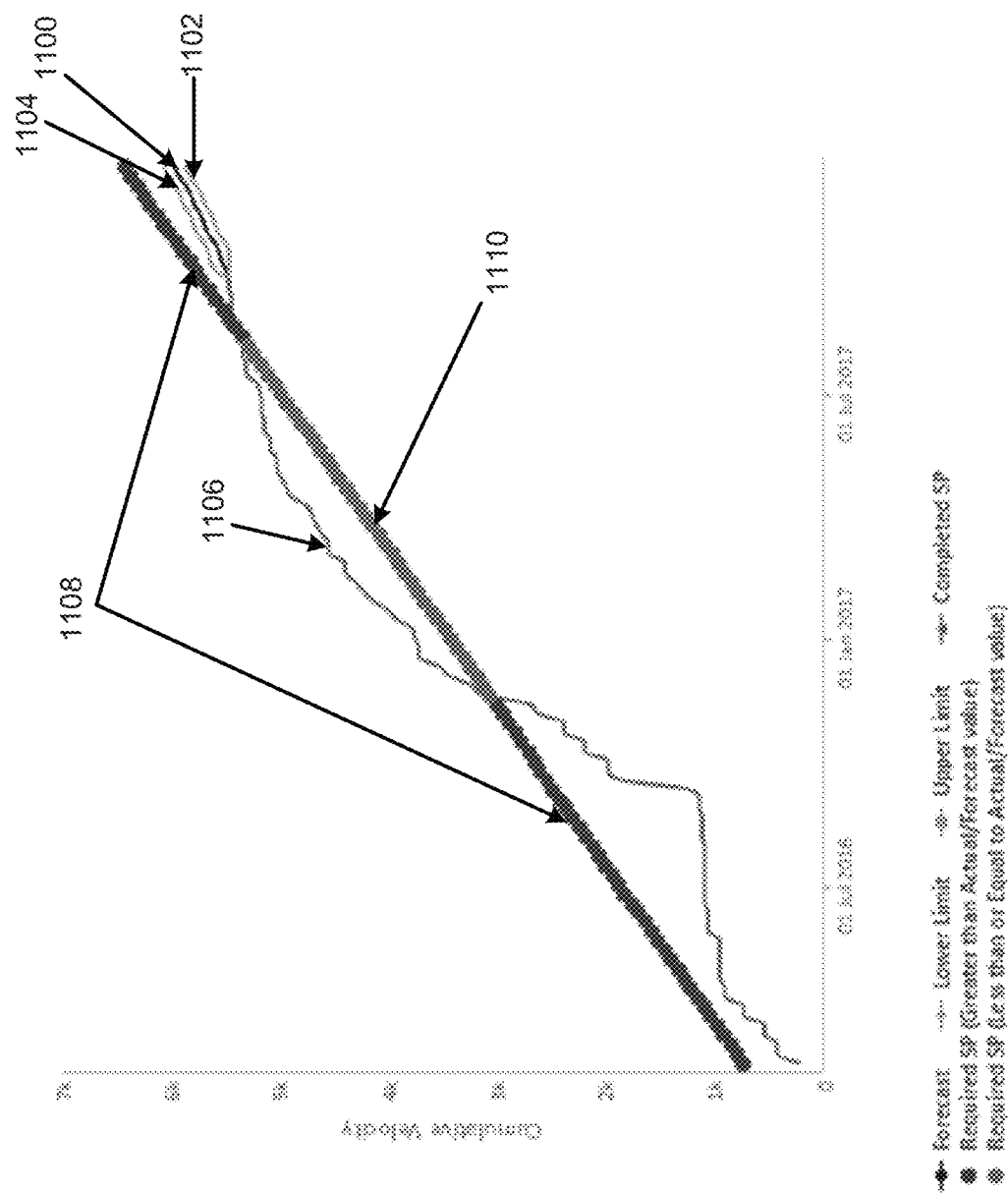

FIGS. 11A and 11B illustrate a cumulative velocity output with respect to the velocity predictor 132 of the apparatus 100 in accordance with an example of the present disclosure.

Referring to FIG. 11A, the cumulative velocity output may include a weekly cumulative forecast, with a backlog target date specified as Jan. 26, 2020, and a confidence interval (%) between 70-95%. In this regard, the cumulative velocity output may include a forecast cumulative velocity at 1100, a lower limit at 1102, an upper limit at 1104, a completed sprint at 1106, a required sprint (greater than actual/forecast value) at 1108, and a required sprint (less than or equal to actual/forecast value) at 1110. Referring to FIG. 11B, various data points plotted in FIG. 11A are listed for weeks 1-10.

Figure 12:
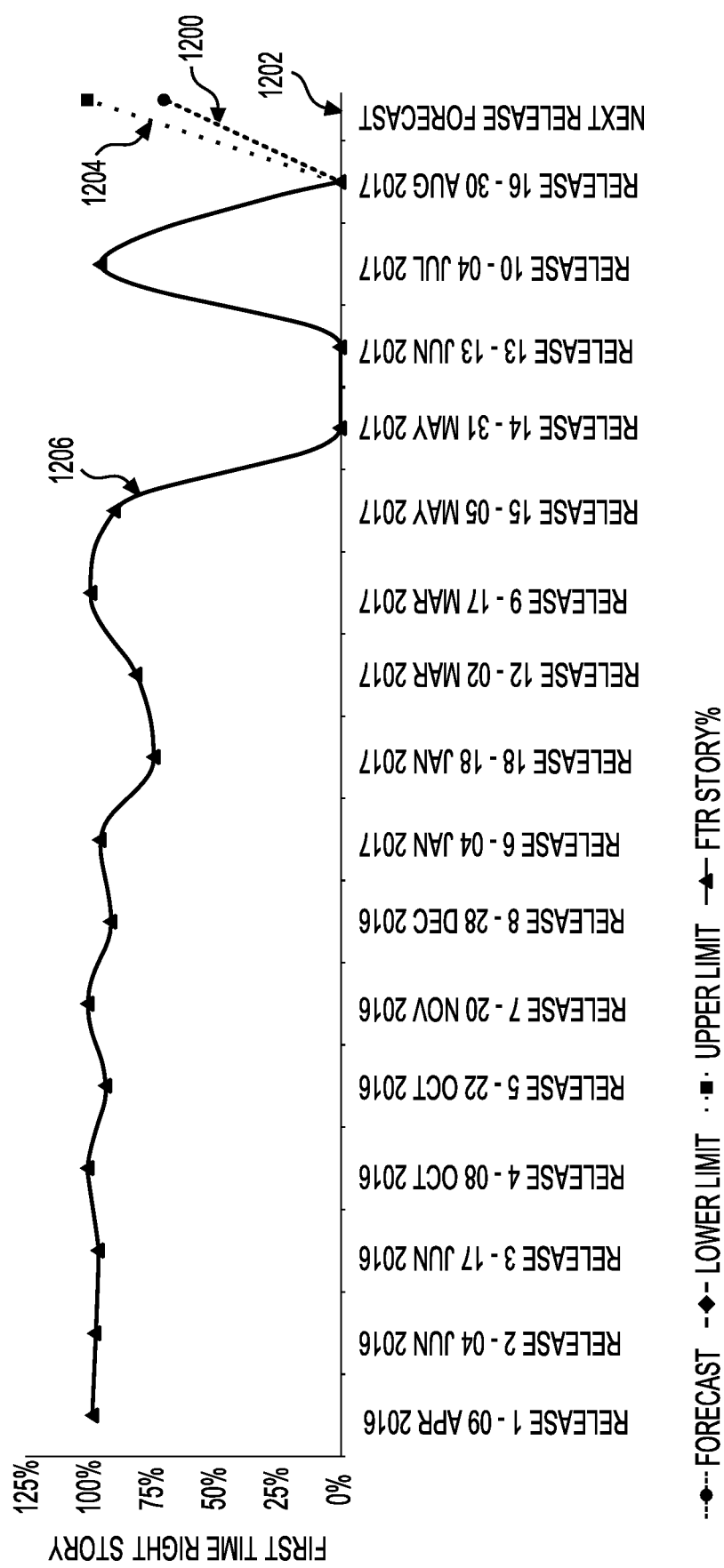
FIG. 12 illustrates a first time right story output with respect to the first time right story predictor of the artificial intelligence and machine learning based project management assistance apparatus of FIG. 1 in accordance with an example of the present disclosure.

FIG. 12 illustrates a first time right story output with respect to the first time right story predictor 136 of the apparatus 100 in accordance with an example of the present disclosure.

Referring to FIG. 12, the first time right story output may include a forecast first time right story percentage at 1200, a lower limit at 1202, an upper limit at 1204, and a first time right story percentage at 1206. For the example of FIG. 12, the forecast name may include "next release forecast", with a forecast percentage of 70%, a lower limit of 0%, an upper limit of 100%, and a confidence interval (%) between 70-95%.

Figure 13A:
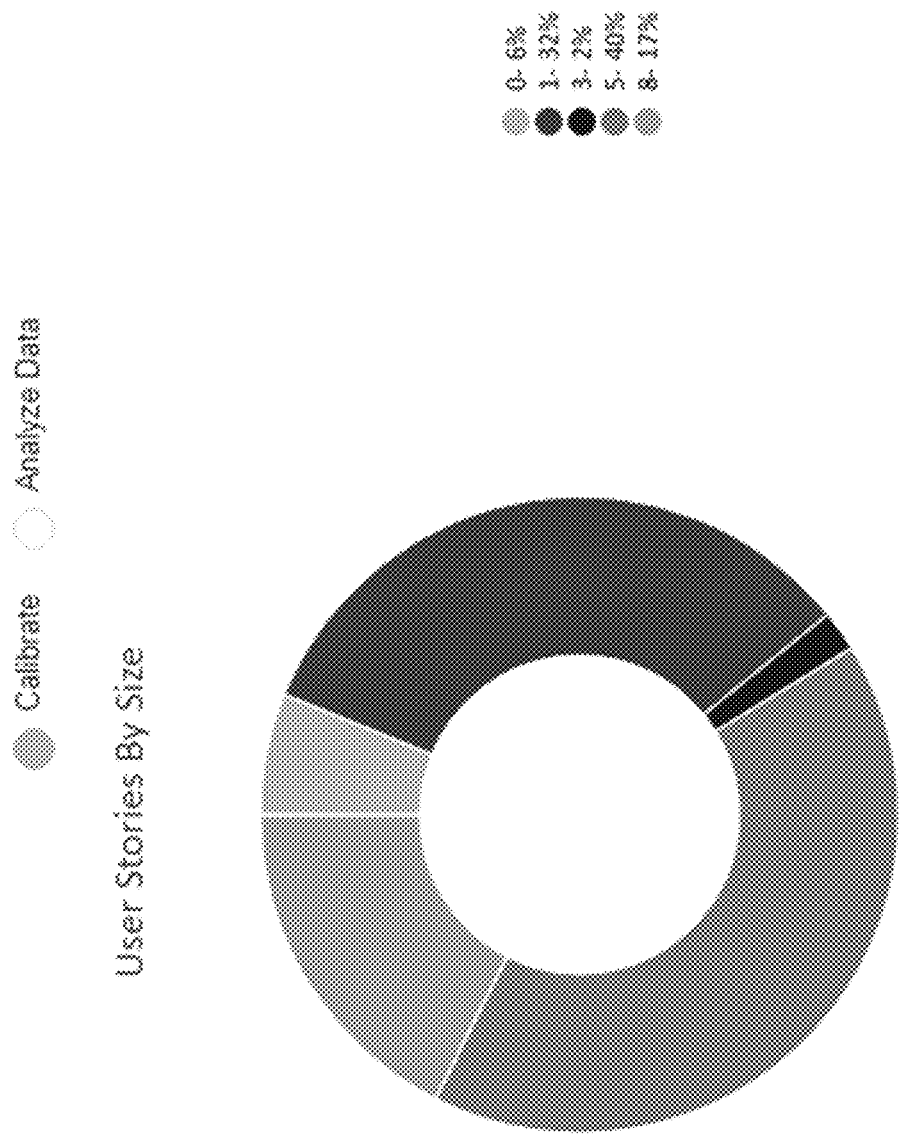
FIGS. 13A-13B illustrate user stories by size and related details for the first time right story predictor of the artificial intelligence and machine learning based project management assistance apparatus of FIG. 1 in accordance with an example of the present disclosure.
Figure 13B:
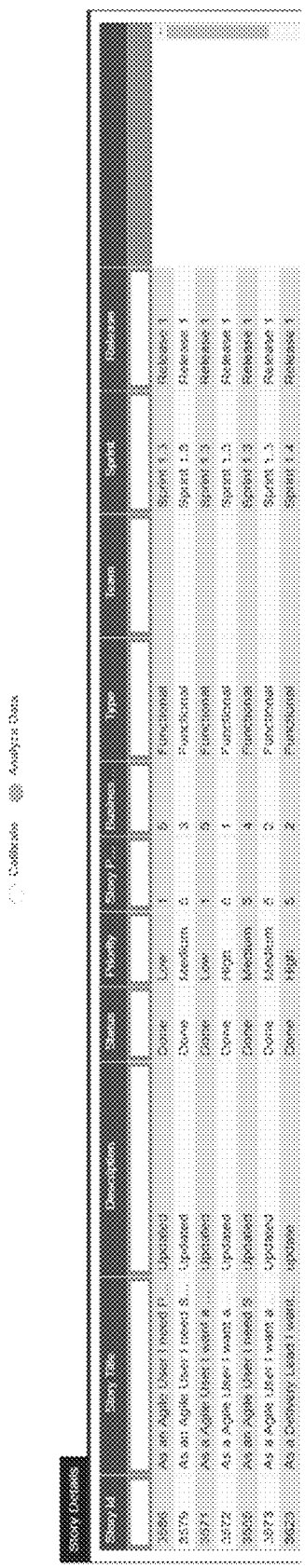

FIGS. 13A-13B illustrate user stories by size and related details for the first time right story predictor 136 of the apparatus 100 in accordance with an example of the present disclosure.

Referring to FIG. 13A, a circular graph, based on selection of the calibrate option, may be displayed to show story point-wise percentage distribution of particular stories (e.g., 6% for story-0, 32% for story-1, 2% for story-3, etc.). Referring to FIG. 13B, based on selection of the analyze data option, story details may be displayed with features such as filter, sort, search, etc.

Figure 14:
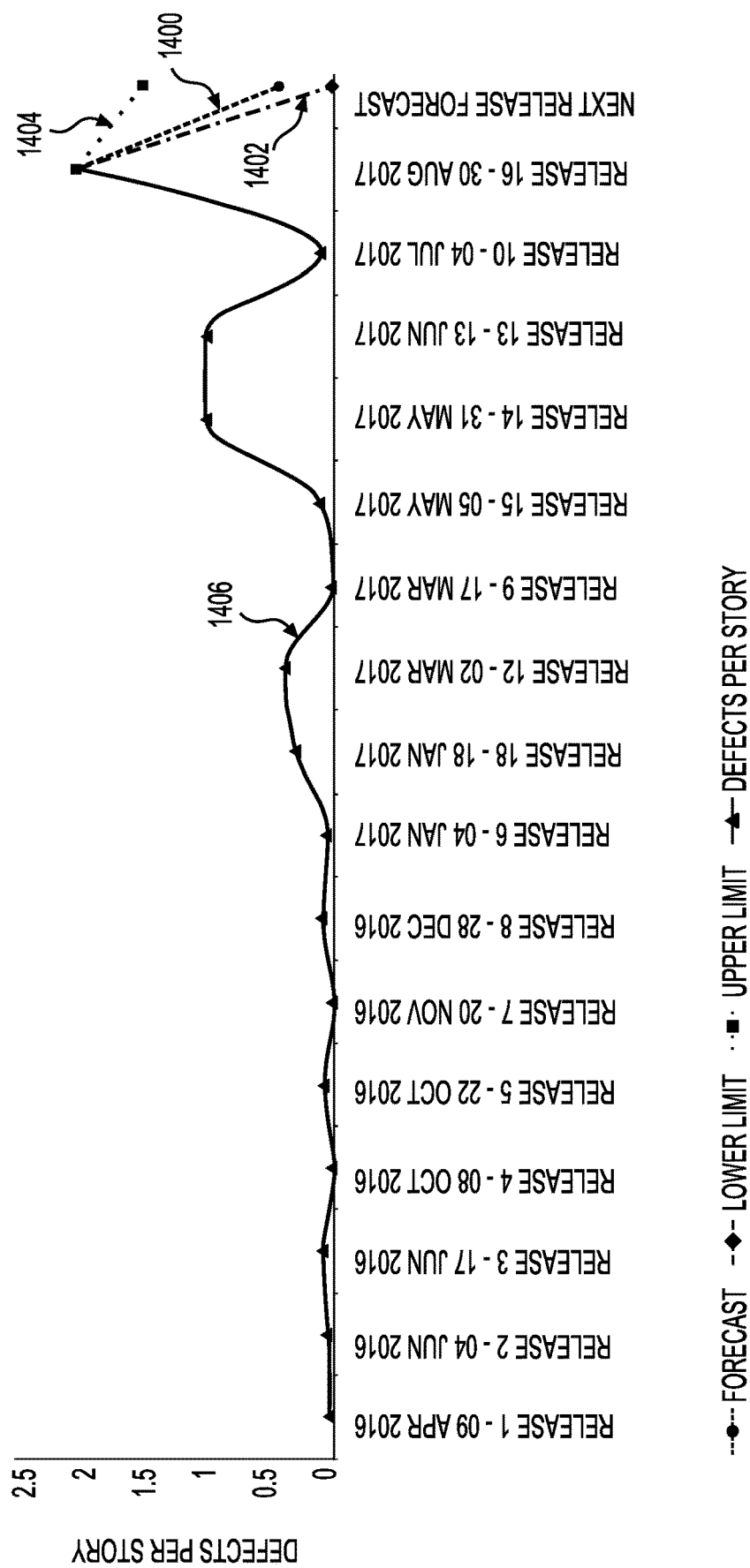
FIG. 14 illustrates a defects per story output with respect to the story quality predictor of the artificial intelligence and machine learning based project management assistance apparatus of FIG. 1 in accordance with an example of the present disclosure.

FIG. 14 illustrates a defects per story output with respect to the story quality predictor 138 of the apparatus 100 in accordance with an example of the present disclosure.

Referring to FIG. 14, the defects per story output may include a forecast defects per story at 1400, a lower limit at 1402, an upper limit at 1404, and a defects per story at 1406. For the example of FIG. 14, the forecast name may include "next release forecast", with a forecast value of 0.42, a lower limit of 0, an upper limit of 1.49, and a confidence interval (%) between 70-95%.

Figure 15A:
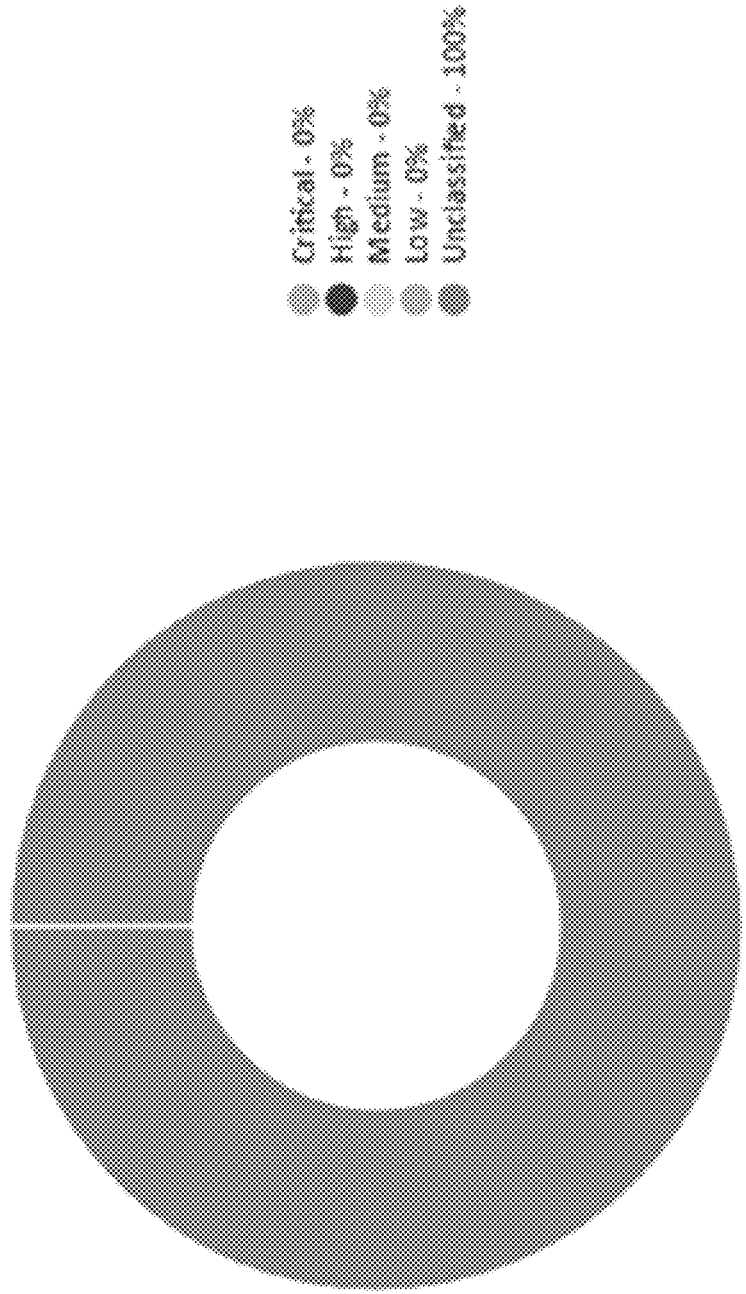
FIGS. 15A and 15B illustrate defects by severity and related details with respect to the story quality predictor of the artificial intelligence and machine learning based project management assistance apparatus of FIG. 1 in accordance with an example of the present disclosure.
Figure 15B:
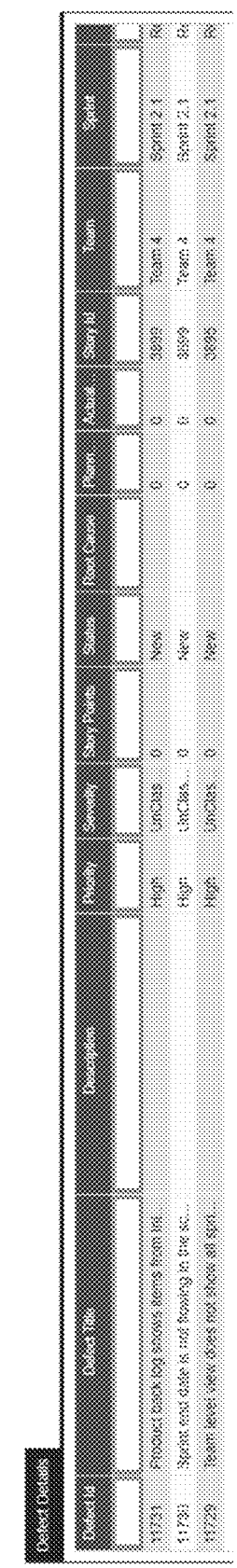

FIGS. 15A and 15B illustrate defects by severity and related details with respect to the story quality predictor 138 of the apparatus 100 in accordance with an example of the present disclosure.

Referring to FIG. 15A, a circular graph, based on selection of the calibrate option, may be displayed to show severity-wise percentage distribution of particular defects (e.g., critical 0%, high 0%, medium 0%, low 0%, and unclassified 100%). Referring to FIG. 15B, based on selection of the analyze data option, defect data may be displayed with features such as filter, sort, search, etc.

Figure 16:
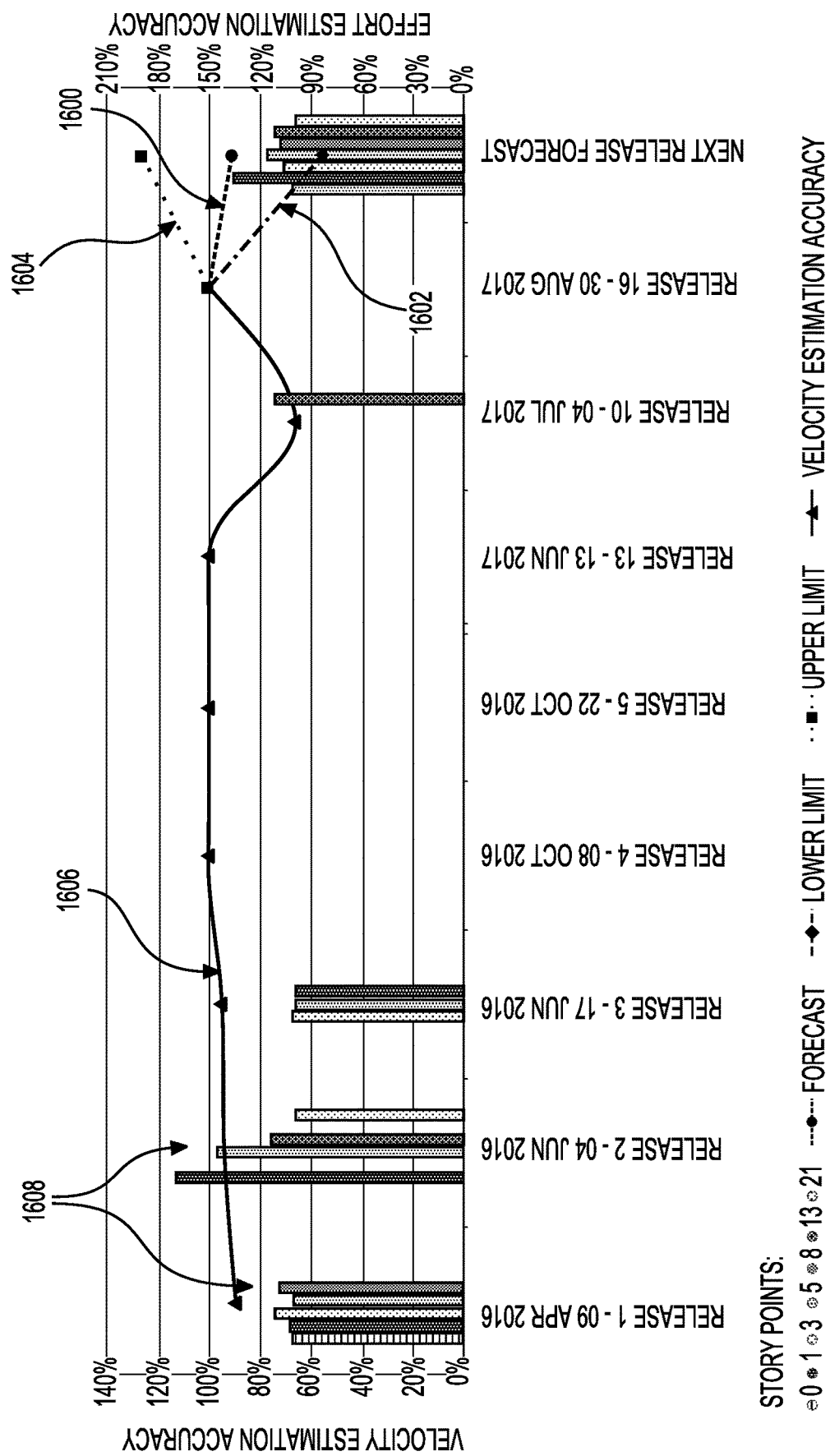
FIG. 16 illustrates a velocity estimation accuracy output with respect to the commitment accuracy predictor of the artificial intelligence and machine learning based project management assistance apparatus of FIG. 1 in accordance with an example of the present disclosure.

FIG. 16 illustrates a velocity estimation accuracy output with respect to the commitment accuracy predictor 142 of the apparatus 100 in accordance with an example of the present disclosure.

Referring to FIG. 16, the velocity estimation accuracy output may include a forecast velocity estimation accuracy at 1600, a lower limit at 1602, an upper limit at 1604, and a velocity estimation accuracy at 1606. For the example of FIG. 16, the forecast name may include "next release velocity estimation accuracy", with a forecast percentage of 91%, a lower limit of 55%, an upper limit of 126%, and a confidence interval (%) between 70-95%. Further story points may be displayed in a bar-graph format at 1608, etc.

Figure 17A:
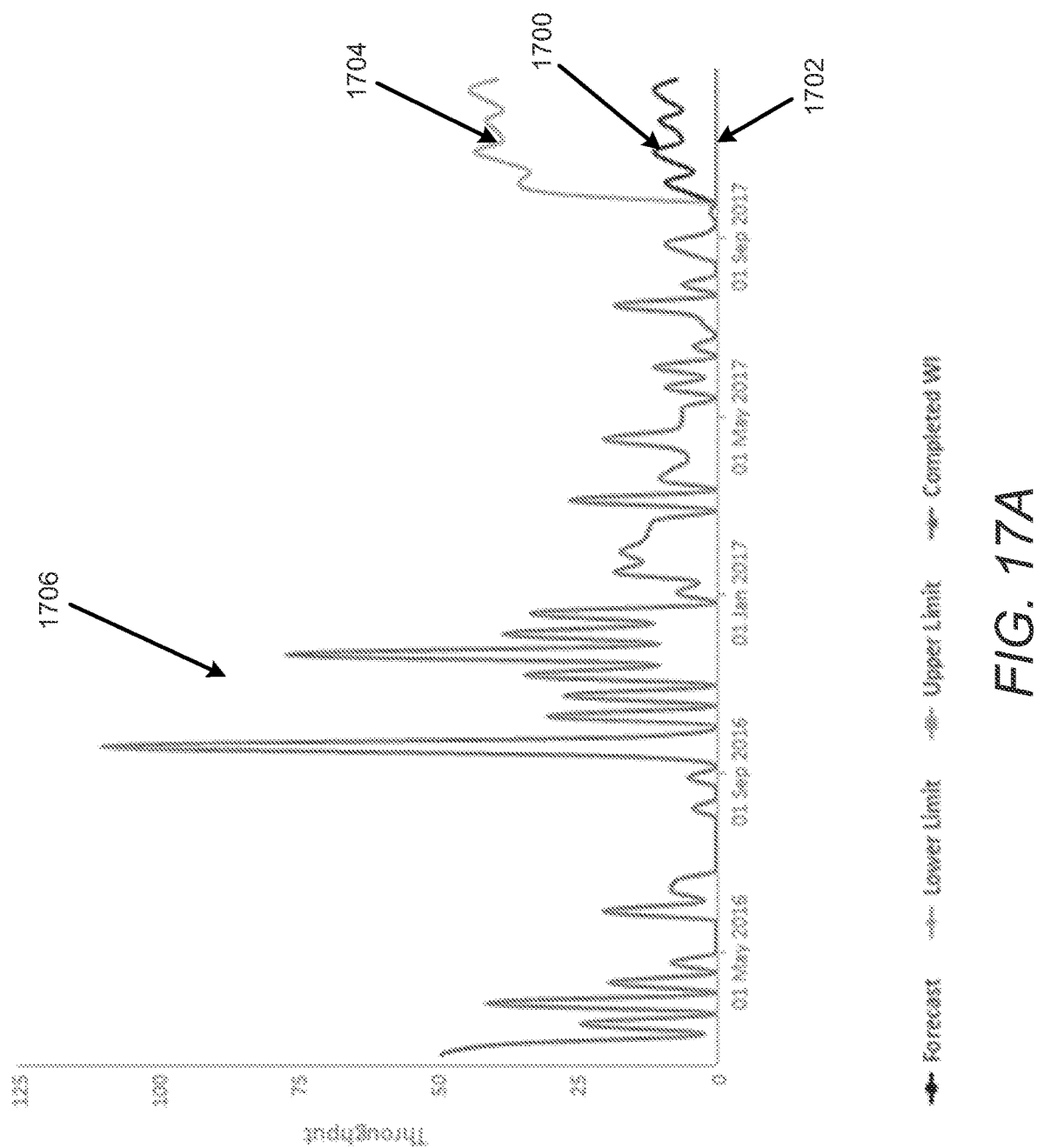

FIGS. 17A and 17B illustrate throughput with respect to the throughput predictor 134 of the apparatus 100 in accordance with an example of the present disclosure.

Referring to FIG. 17A, the throughput may include a forecast, with a confidence interval (%) between 70-95%. In this regard, the throughput may include a forecast at 1700, a lower limit at 1702, an upper limit at 1704, and a completed display at 1706. Referring to FIG. 17B, various data points plotted in FIG. 17A are listed for weeks 1-12.

Figure 18:
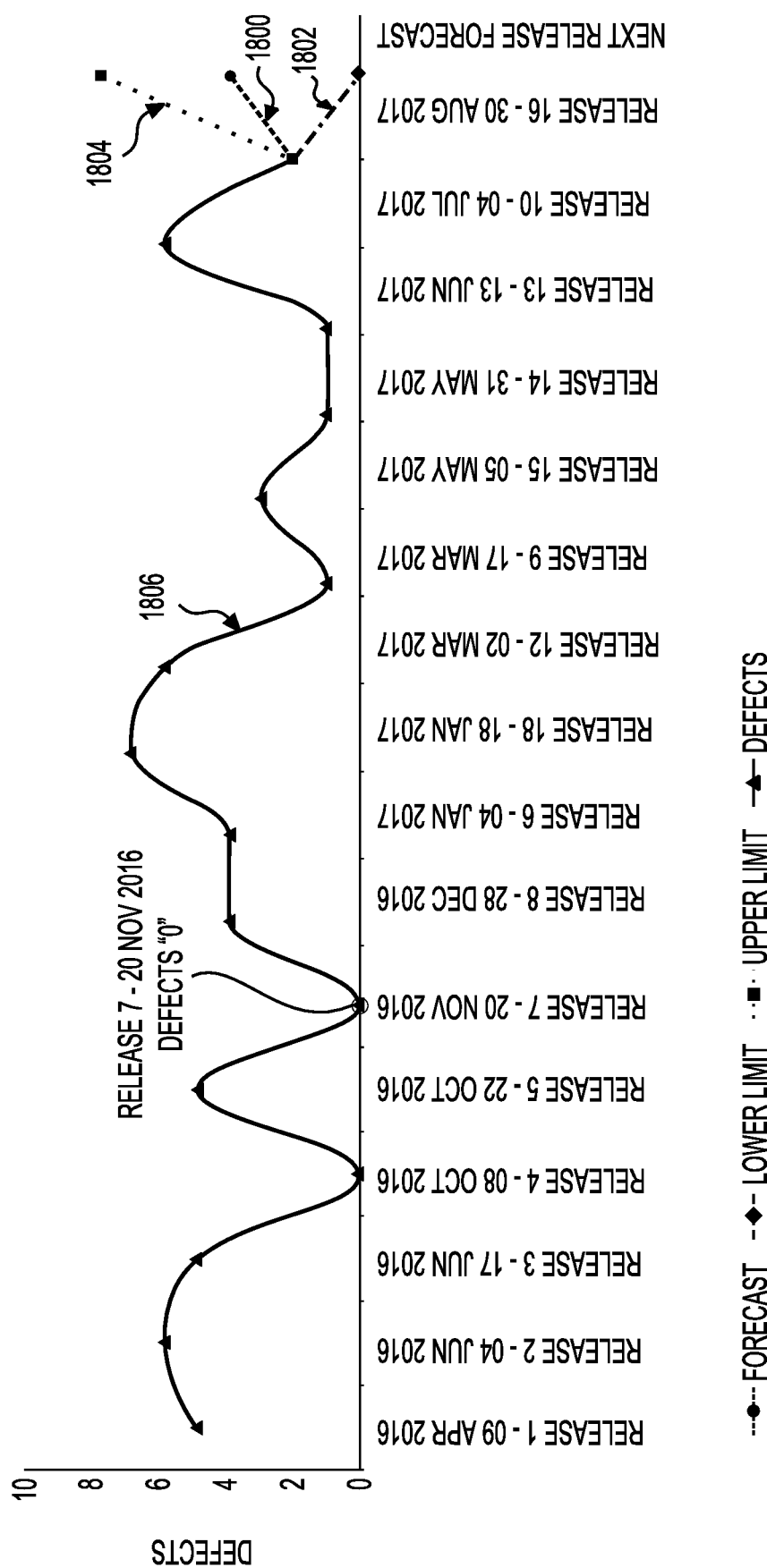
FIG. 18 illustrates a defects output with respect to the defect injection predictor of the artificial intelligence and machine learning based project management assistance apparatus of FIG. 1 in accordance with an example of the present disclosure.

FIG. 18 illustrates a defects output with respect to the defect injection predictor 140 of the apparatus 100 in accordance with an example of the present disclosure.

Referring to FIG. 18, the defects output may include a forecast defects at 1800, a lower limit at 1802, an upper limit at 1804, and defects at 1806. For the example of FIG. 18, the forecast name may include "next release forecast", with a forecast of 4, a lower limit of 0, an upper limit of 8, and a confidence interval (%) between 70-95%.

Figure 19A:
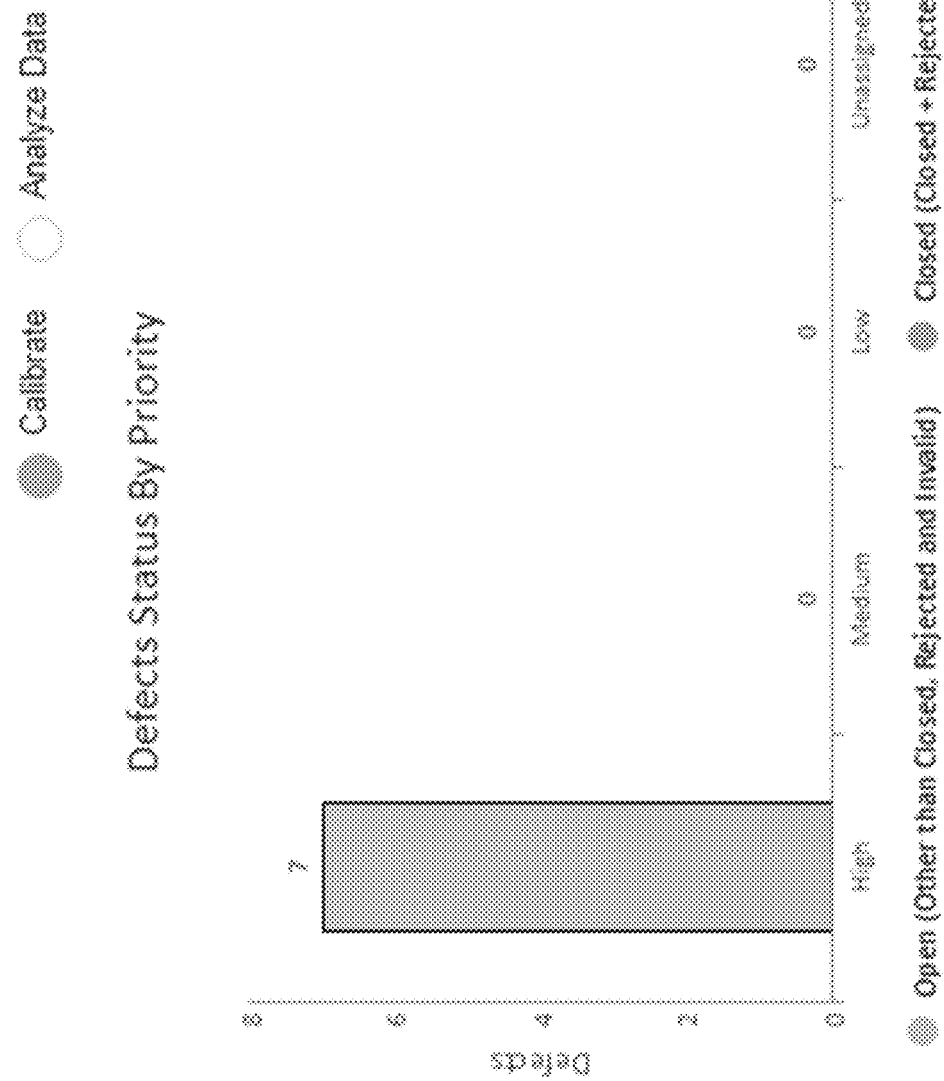
Figure 19B:
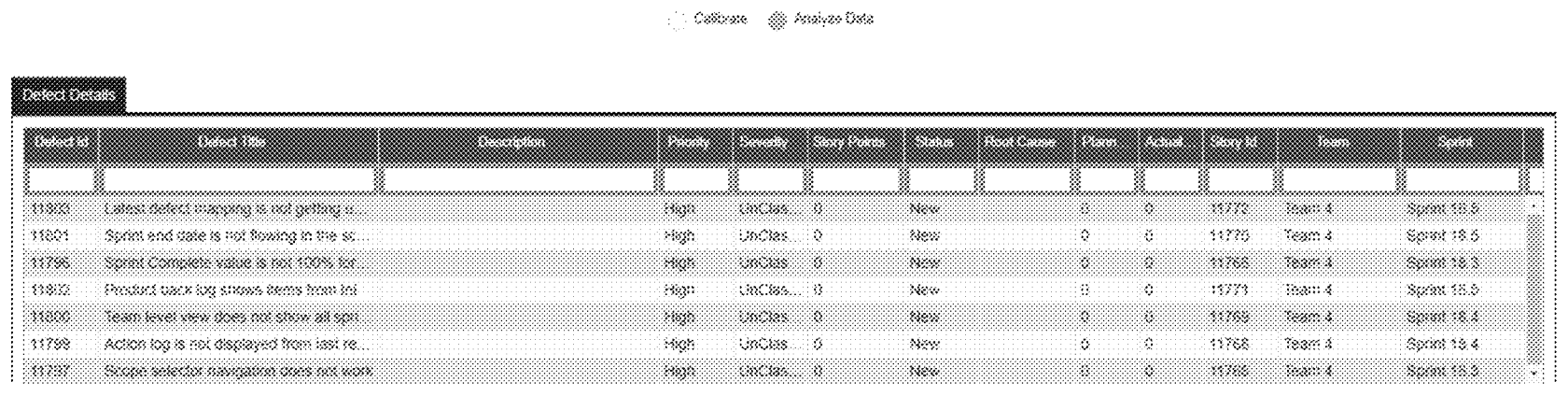

FIGS. 19A and 19B illustrate defects status by priority and defect details with respect to the defect injection predictor 140 of the apparatus 100 in accordance with an example of the present disclosure.

Referring to FIG. 19A, a stacked bar graph, based on selection of the calibrate option, may be displayed to illustrate closed and open defects categorized by priority (e.g., open (other than closed, rejected, and invalid), closed, etc.). Referring to FIG. 19B, based on selection of the analyze data option, defect data may be displayed with features such as filter, sort, search, etc.

Figure 20:
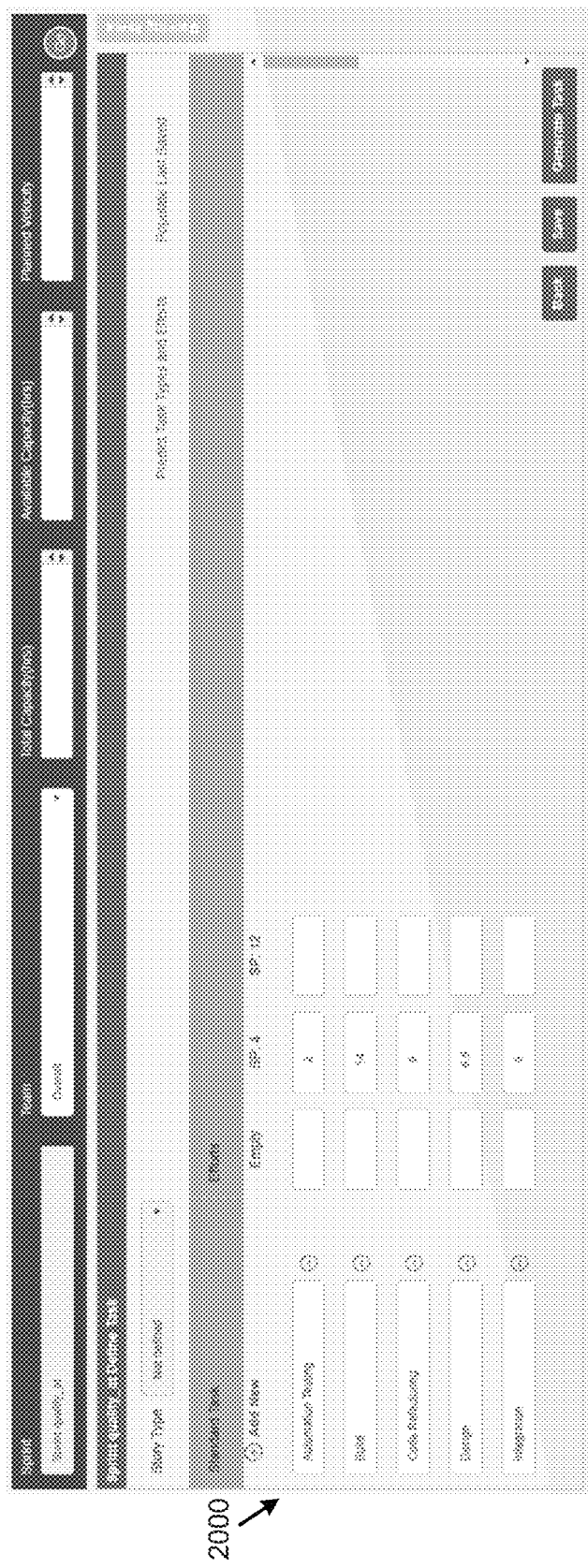
FIG. 20 illustrates sprint quality with respect to the task predictor of the artificial intelligence and machine learning based project management assistance apparatus of FIG. 1 in accordance with an example of the present disclosure.

FIG. 20 illustrates sprint quality with respect to the task predictor 144 of the apparatus 100 in accordance with an example of the present disclosure.

Referring to FIG. 20, sprint quality with respect to the task predictor 144 may be displayed with respect to a task that may be defined at 2000.

Figure 21:
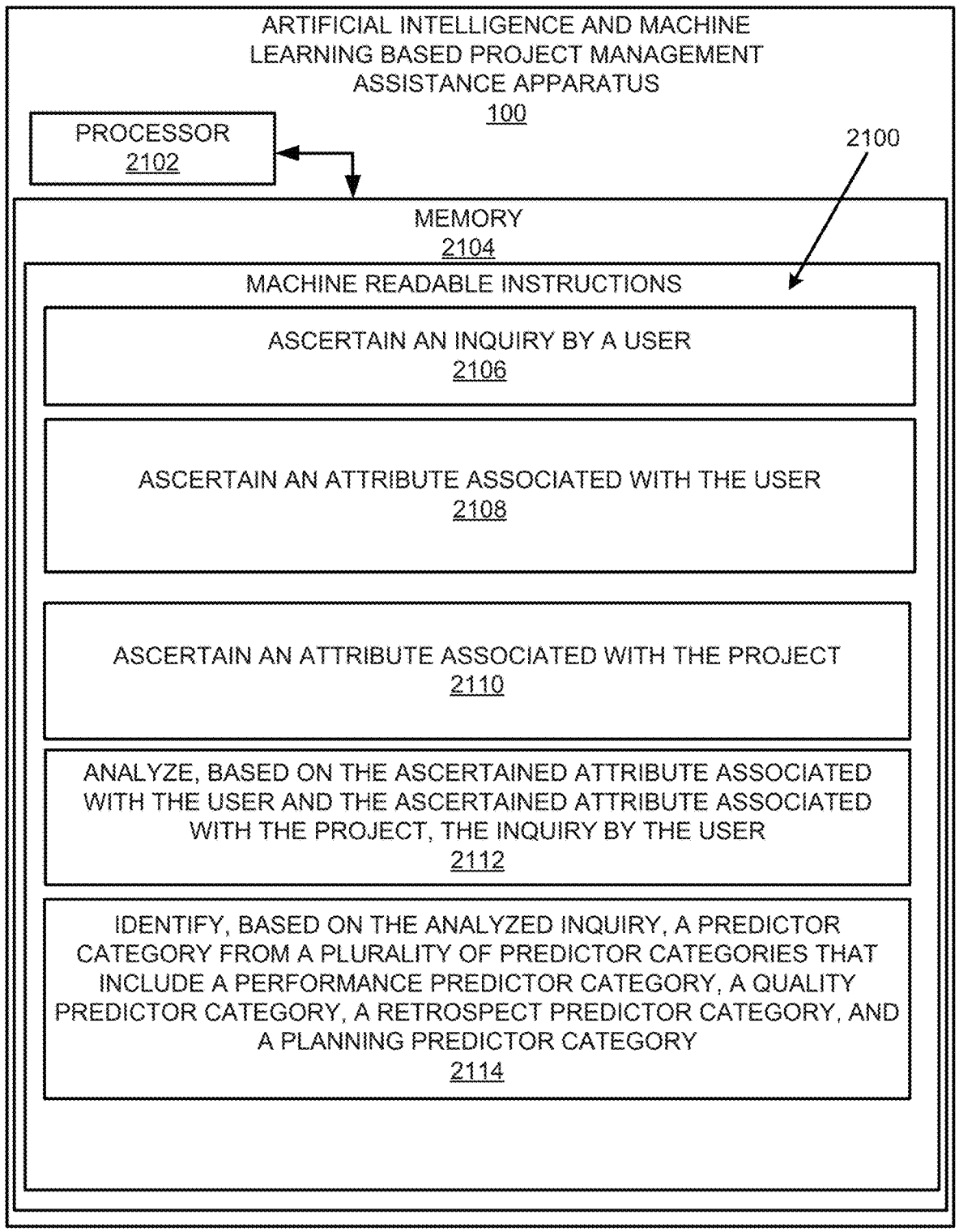
FIG. 21 illustrates an example block diagram for artificial intelligence and machine learning based project management assistance in accordance with an example of the present disclosure.
Figure 21:
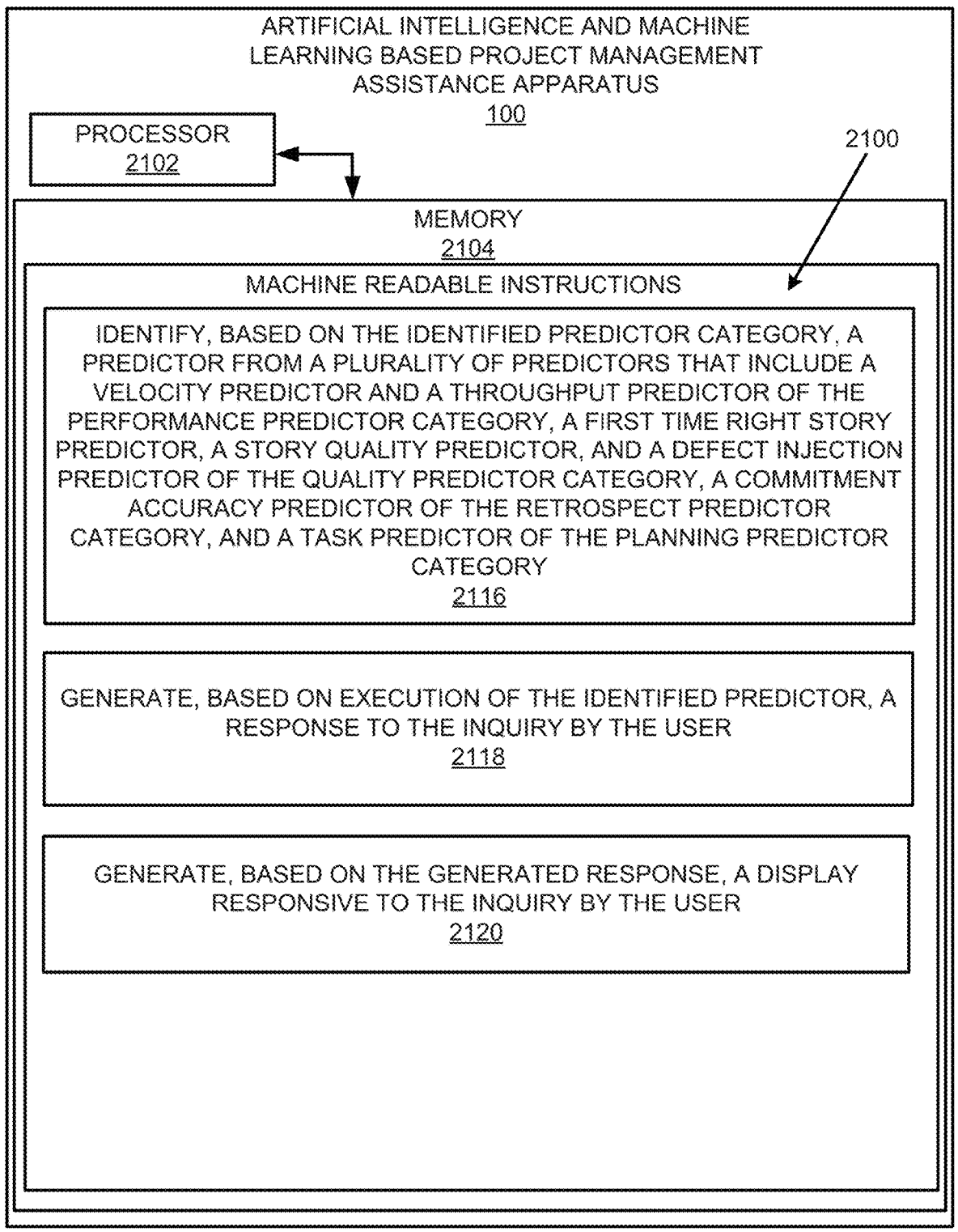
Figure 22:
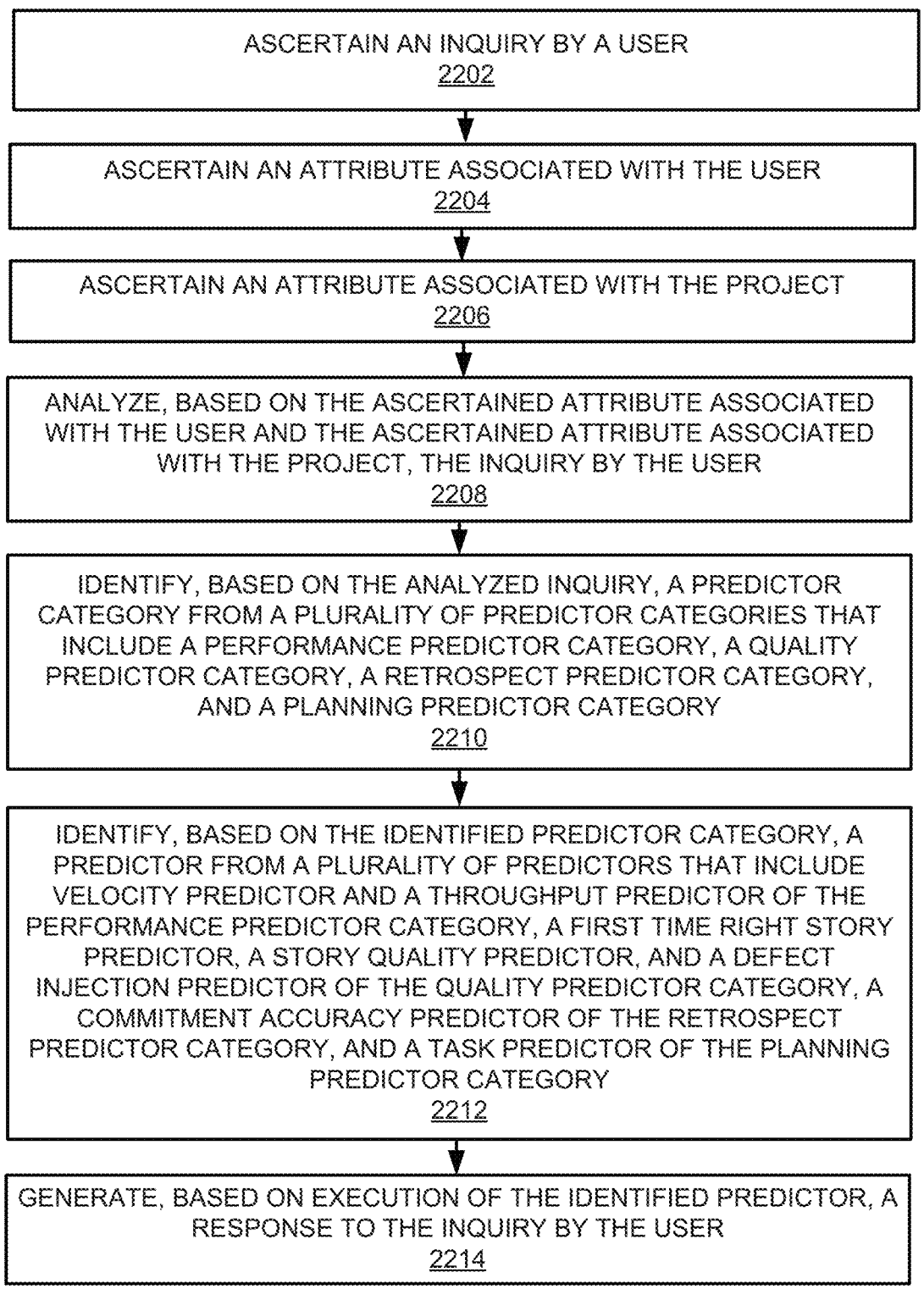
FIG. 22 illustrates a flowchart of an example method for artificial intelligence and machine learning based project management assistance in accordance with an example of the present disclosure.
Figure 23:
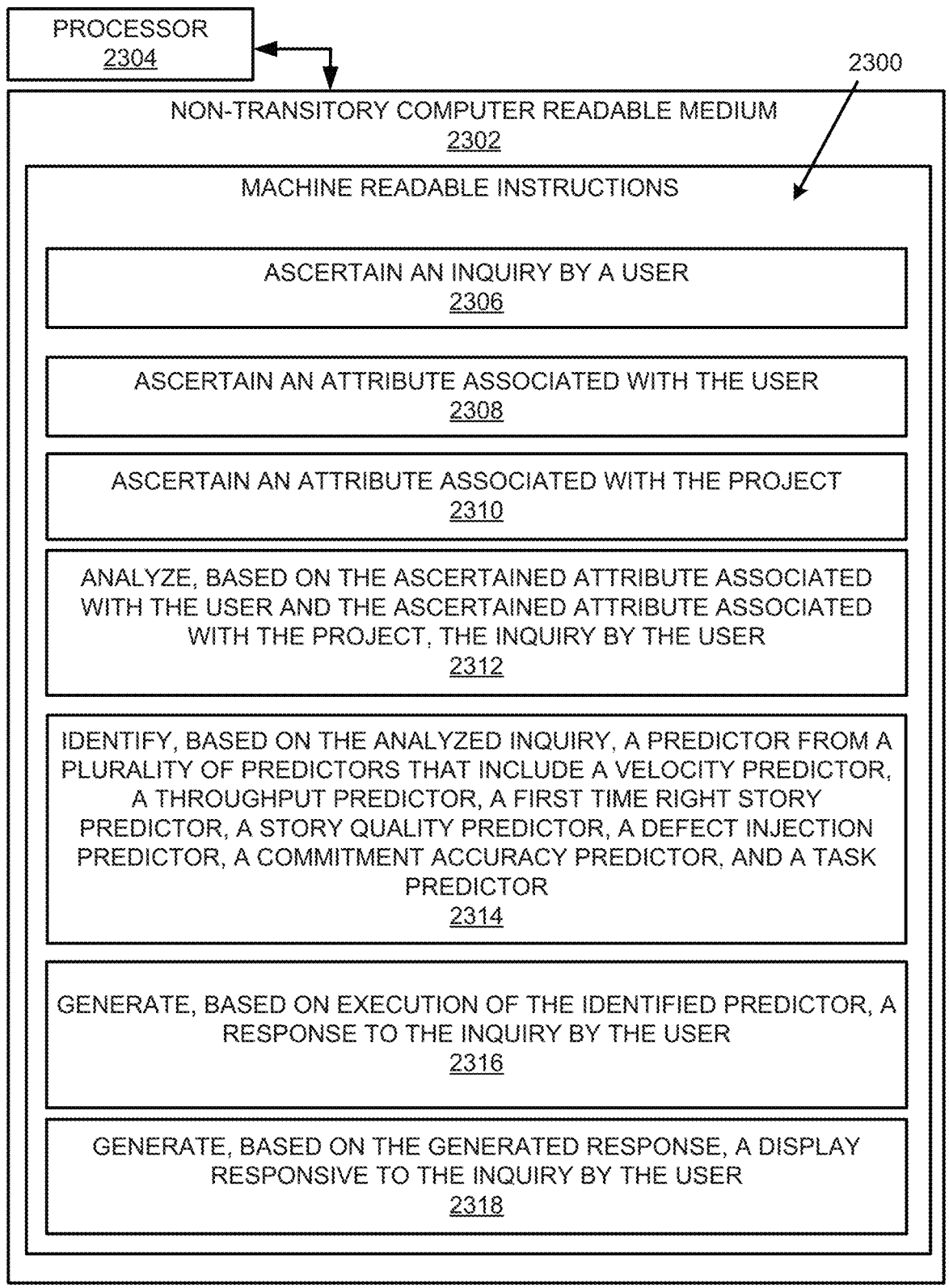
FIG. 23 illustrates a further example block diagram for artificial intelligence and machine learning based project management assistance in accordance with another example of the present disclosure.

FIGS. 21-23 respectively illustrate an example block diagram 2100, a flowchart of an example method 2200, and a further example block diagram 2300 for artificial intelligence and machine learning based project management assistance, according to examples. The block diagram 2100, the method 2200, and the block diagram 2300 may be implemented on the apparatus 100 described above with reference to FIG. 1 by way of example and not of limitation. The block diagram 2100, the method 2200, and the block diagram 2300 may be practiced in other apparatus. In addition to showing the block diagram 2100, FIG. 21 shows hardware of the apparatus 100 that may execute the instructions of the block diagram 2100. The hardware may include a processor 2102, and a memory 2104 storing machine readable instructions that when executed by the processor cause the processor to perform the instructions of the block diagram 2100. The memory 2104 may represent a non-transitory computer readable medium. FIG. 22 may represent an example method for artificial intelligence and machine learning based project management assistance, and the steps of the method. FIG. 23 may represent a non-transitory computer readable medium 2302 having stored thereon machine readable instructions to provide artificial intelligence and machine learning based project management assistance according to an example. The machine readable instructions, when executed, cause a processor 2304 to perform the instructions of the block diagram 2300 also shown in FIG. 23.

The processor 2102 of FIG. 21 and/or the processor 2104 of FIG. 21 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2302 of FIG. 23), such as hardware storage devices (e.g., RAM (random access memory), ROM (read only memory), EPROM (erasable, programmable ROM), EEPROM (electrically erasable, programmable ROM), hard drives, and flash memory). The memory 2104 may include a RAM, where the machine readable instructions and data for a processor may reside during runtime.

Referring to FIGS. 1-21, and particularly to the block diagram 2100 shown in FIG. 21, the memory 2104 may include instructions 2106 to ascertain an inquiry 104 by a user 106. The inquiry 104 may be related to a project 108.

The processor 2102 may fetch, decode, and execute the instructions 2108 to ascertain an attribute 112 associated with the user 106.

The processor 2102 may fetch, decode, and execute the instructions 2110 to ascertain an attribute 116 associated with the project 108.

The processor 2102 may fetch, decode, and execute the instructions 2112 to analyze, based on the ascertained attribute associated with the user 106 and the ascertained attribute associated with the project 108, the inquiry 104 by the user 106.

The processor 2102 may fetch, decode, and execute the instructions 2114 to identify, based on the analyzed inquiry 104, a predictor category 120 from a plurality of predictor categories that include a performance predictor category 122, a quality predictor category 124, a retrospect predictor category 126, and a planning predictor category 128.

The processor 2102 may fetch, decode, and execute the instructions 2116 to identify, based on the identified predictor category 120, a predictor 130 from a plurality of predictors that include a velocity predictor 132 and a throughput predictor 134 of the performance predictor category 122, a first time right story predictor 136, a story quality predictor 138, and a defect injection predictor 140 of the quality predictor category 124, a commitment accuracy predictor 142 of the retrospect predictor category 126, and a task predictor 144 of the planning predictor category 128.

The processor 2102 may fetch, decode, and execute the instructions 2118 to generate, based on execution of the identified predictor 130, a response 146 to the inquiry 104 by the user 106.

The processor 2102 may fetch, decode, and execute the instructions 2120 to generate, based on the generated response 146, a display 150 responsive to the inquiry 104 by the user 106.

Referring to FIGS. 1-20 and 22, and particularly FIG. 22, for the method 2200, at block 2202, the method may include ascertaining an inquiry 104 by a user 106. The inquiry 104 may be related to a project 108.

At block 2204, the method may include ascertaining an attribute 112 associated with the user 106.

At block 2206, the method may include analyzing ascertaining an attribute 116 associated with the project 108.

At block 2208, the method may include analyzing based on the ascertained attribute associated with the user 106 and the ascertained attribute associated with the project 108, the inquiry 104 by the user 106.

At block 2210, the method may include identifying based on the analyzed inquiry 104, a predictor category 120 from a plurality of predictor categories that include a performance predictor category 122, a quality predictor category 124, a retrospect predictor category 126, and a planning predictor category 128.

At block 2212, the method may include identifying based on the identified predictor category 120, a predictor 130 from a plurality of predictors that include a velocity predictor 132 and a throughput predictor 134 of the performance predictor category 122, a first time right story predictor 136, a story quality predictor 138, and a defect injection predictor 140 of the quality predictor category 124, a commitment accuracy predictor 142 of the retrospect predictor category 126, and a task predictor 144 of the planning predictor category 128.

At block 2214, the method may include generating based on execution of the identified predictor, a response 146 to the inquiry 104 by the user 106.

Referring to FIGS. 1-20 and 23, and particularly FIG. 23, for the block diagram 2300, the non-transitory computer readable medium 2302 may include instructions 2306 to ascertain an inquiry 104 by a user 106. The inquiry 104 may be related to a project 108.

The processor 2304 may fetch, decode, and execute the instructions 2308 to ascertain an attribute 112 associated with the user 106.

The processor 2304 may fetch, decode, and execute the instructions 2310 to ascertain an attribute 116 associated with the project 108.

The processor 2304 may fetch, decode, and execute the instructions 2312 to analyze, based on the ascertained attribute associated with the user 106 and the ascertained attribute associated with the project 108, the inquiry 104 by the user 106.

The processor 2304 may fetch, decode, and execute the instructions 2314 to identify, based on the analyzed inquiry 104, a predictor 130 from a plurality of predictors that include a velocity predictor 132, a throughput predictor 134, a first time right story predictor 136, a story quality predictor 138, a defect injection predictor 140, a commitment accuracy predictor 142, and a task predictor 144.

The processor 2304 may fetch, decode, and execute the instructions 2316 to generate, based on execution of the identified predictor, a response 146 to the inquiry 104 by the user 106.

The processor 2304 may fetch, decode, and execute the instructions 2318 to generate, based on the generated response 146, a display 150 responsive to the inquiry 104 by the user 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An artificial intelligence and machine learning based project management assistance apparatus comprising:
    at least one first hardware processor of a first server;
    a user inquiry analyzer, executed by the at least one first hardware processor, to ascertain an inquiry by a user, wherein the inquiry is related to a project;
    a user attribute analyzer, executed by the at least one first hardware processor, to ascertain an attribute associated with the user;
    a project attribute analyzer, executed by the at least one first hardware processor, to ascertain an attribute associated with the project;
    at least one second hardware processor of a second server disposed at a remote location from the first server;
    a network to relay information between the first server and the second server;
    an inquiry response generator, executed by the at least one second hardware processor, to
    receive, over the network, the information that includes the ascertained attribute associated with the user, the ascertained attribute associated with the project, and the inquiry by the user,
    analyze, based on the ascertained attribute associated with the user and the ascertained attribute associated with the project, the inquiry by the user,
    identify, based on the analyzed inquiry, a predictor category from a plurality of predictor categories that include a performance predictor category, a quality predictor category, a retrospect predictor category, and a planning predictor category,
    identify, based on the identified predictor category, a predictor from a plurality of predictors that include
        a velocity predictor and a throughput predictor of the performance predictor category, wherein the velocity predictor is executed by the at least one second hardware processor to determine velocity associated with the project for a future time duration based on a cumulative velocity and a required velocity, and determine
            the cumulative velocity as a function of a total number of story points completed until a specified date, and
            the required velocity as a sum of story points for complete product backlog, divided by a time duration between a first release start date and a backlog target date,
        a first time right story predictor, a story quality predictor, and a defect injection predictor of the quality predictor category,
        a commitment accuracy predictor of the retrospect predictor category, and
        a task predictor of the planning predictor category, wherein the task predictor is executed by the at least one second hardware processor to
            generate an output that includes task types for stories scoped in a sprint, and
            perform exponential smoothing on the generated output,
    generate, based on execution of the identified predictor, a response to the inquiry by the user, and
    transmit, over the network and to the first server, the response to the inquiry by the user; and
    a response display generator, executed by the at least one first hardware processor, to
    generate, based on the generated response, a display responsive to the inquiry by the user,
    wherein the first time right story predictor is executed by the at least one second hardware processor to
    select, from the display, a plot point,
    display, based on the selection of the plot point, options to calibrate and analyze data,
    select the calibration option, and
    display, based on the selection of the calibration option, a circular graph to illustrate story point-wise percentage distribution of first time right stories of the plot point.

2. The apparatus according to claim 1, wherein the first time right story predictor is executed by the at least one second hardware processor to determine a first time right story value for future release and sprint.

3. The apparatus according to claim 2, wherein the first time right story predictor is executed by the at least one second hardware processor to determine the first time right story value as a function of a total number of user stories performed with no defect, divided by a total number of user stories performed.

4. The apparatus according to claim 1, wherein the story quality predictor is executed by the at least one second hardware processor to determine a number of defects per story for future release and sprint.

5. The apparatus according to claim 4, wherein the story quality predictor is executed by the at least one second hardware processor to determine the number of defects per story as a function of a total number of defects associated to stories performed for at least one of a particular sprint or release, divided by a total number of stories performed for the at least one of the particular sprint or release.

6. The apparatus according to claim 1, wherein the commitment accuracy predictor is executed by the at least one second hardware processor to determine a commitment accuracy value for future release and sprint.

7. The apparatus according to claim 6, wherein the commitment accuracy predictor is executed by the at least one second hardware processor to determine the commitment accuracy value as a function of a velocity estimation accuracy value determined as a function of total completed story points, divided by total committed story points, and an effort estimation accuracy value determined as a function of total planned efforts, divided by total actual efforts.

8. The apparatus according to claim 1, wherein the throughput predictor is executed by the at least one second hardware processor to determine a number of work items for the future time duration.

9. The apparatus according to claim 8, wherein the throughput predictor is executed by the at least one second hardware processor to determine the number of work items as a function of a total number of work items closed during a specified time duration.

10. The apparatus according to claim 1, wherein the defect injection predictor is executed by the at least one second hardware processor to determine a number of defects for future sprint and release.

11. The apparatus according to claim 10, wherein the defect injection predictor is executed by the at least one second hardware processor to determine the number of defects for future sprint and release as a function of a total number of defects raised against stories worked upon as part of a corresponding sprint and release.

12. The apparatus according to claim 1, wherein the task predictor is executed by the at least one second hardware processor to determine the task types for stories scoped in the sprint as a function of different use story types of stories added to selected sprint backlog.

13. A method for artificial intelligence and machine learning based project management assistance comprising:
ascertaining, by at least one first hardware processor of a first server, an inquiry by a user, wherein the inquiry is related to a project;
ascertaining, by the at least one first hardware processor, an attribute associated with the user;
ascertaining, by the at least one first hardware processor, an attribute associated with the project;
analyzing, by at least one second hardware processor of a second server disposed at a remote location from the first server, based on the ascertained attribute associated with the user and the ascertained attribute associated with the project, the inquiry by the user;
identifying, by the at least one second hardware processor, based on the analyzed inquiry, a predictor category from a plurality of predictor categories that include a performance predictor category, a quality predictor category, a retrospect predictor category, and a planning predictor category;
identifying, by the at least one second hardware processor, based on the identified predictor category, a predictor from a plurality of predictors that include
a velocity predictor and a throughput predictor of the performance predictor category,
a first time right story predictor, a story quality predictor, and a defect injection predictor of the quality predictor category,
a commitment accuracy predictor of the retrospect predictor category, and
a task predictor of the planning predictor category, wherein the task predictor is executed by the at least one second hardware processor to
generate an output that includes task types for stories scoped in a sprint, and
perform exponential smoothing on the generated output of the task predictor;

generating, by the at least one first hardware processor, based on execution of the identified predictor, a display in response to the inquiry by the user;
selecting, by the at least one first hardware processor, from the display, a plot point
displaying, by the at least one first hardware processor, based on the selection of the plot point, options to calibrate and analyze data;
selecting, by the at least one first hardware processor, the calibration option; and
displaying, by the at least one first hardware processor, based on the selection of the calibration option, a circular graph to illustrate story point-wise percentage distribution of first time right stories of the plot point.

14. The method according to claim 13, further comprising:
determining, for the velocity predictor, a cumulative velocity as a function of a total number of story points completed until a specified date; and
determining, for the velocity predictor, a required velocity as a sum of story points for complete product backlog, divided by a time duration between a first release start date and a backlog target date.

15. The method according to claim 13, further comprising:
determining, for the first time right story predictor, a first time right story value as a function of a total number of user stories performed with no defect, divided by a total number of user stories performed.

16. A non-transitory computer readable medium having stored thereon machine readable instructions, the machine readable instructions:
when executed by at least one first hardware processor of a first server, cause the at least one first hardware processor to:
ascertain an inquiry by a user, wherein the inquiry is related to a project;
ascertain an attribute associated with the user; and
ascertain an attribute associated with the project;
when executed by at least one second hardware processor of a second server disposed at a remote location from the first server, cause the at least one second hardware processor to:
analyze, based on the ascertained attribute associated with the user and the ascertained attribute associated with the project, the inquiry by the user;
identify, based on the analyzed inquiry, a predictor from a plurality of predictors that include a velocity predictor, a throughput predictor, a first time right story predictor, a story quality predictor, a defect injection predictor, a commitment accuracy predictor, and a task predictor, wherein the task predictor is to
generate an output that includes task types for stories scoped in a sprint, and
perform exponential smoothing on the generated output of the task predictor; and
generate, based on execution of the identified predictor, a response to the inquiry by the user;
generate, by the at least one first hardware processor of the first server and based on the generated response, a display responsive to the inquiry by the user;
select, from the display, a plot point;
display, based on the selection of the plot point, options to calibrate and analyze data;
select the calibration option; and display, based on the selection of the calibration option, a circular graph to illustrate story point-wise percentage distribution of first time right stories of the plot point.

17. The non-transitory computer readable medium according to claim 16, wherein the machine readable instructions, when executed by the at least one second hardware processor, further cause the at least one second hardware processor to:
determine, for the story quality predictor, a number of defects per story as a function of a total number of defects associated to stories performed for at least one of a particular sprint or release, divided by a total number of stories performed for the at least one of the particular sprint or release.

* * * * *